(12) United States Patent
Matsui et al.

(10) Patent No.: US 10,423,374 B2
(45) Date of Patent: Sep. 24, 2019

(54) IMAGE FORMING APPARATUS AND METHOD FOR CONTROLLING IMAGE FORMING APPARATUS FOR REDUCING PRINT PROCESSING TIME

(71) Applicant: CANON KABUSHIKI KAISHA, Tokyo (JP)

(72) Inventors: Kenta Matsui, Moriya (JP); Tomohide Kubota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/909,256

(22) Filed: Mar. 1, 2018

(65) Prior Publication Data

US 2018/0260174 A1  Sep. 13, 2018

(30) Foreign Application Priority Data

Mar. 7, 2017 (JP) ................................. 2017-042666

(51) Int. Cl.
*G06F 3/12* (2006.01)
*G06K 15/02* (2006.01)

(52) U.S. Cl.
CPC ....... *G06F 3/1237* (2013.01); *G06K 15/1806* (2013.01); *G06K 15/1856* (2013.01)

(58) Field of Classification Search
CPC .. G06F 3/1237; G06F 3/1238; G06K 15/1806
USPC ................................................ 358/402, 474
See application file for complete search history.

(56) References Cited

U.S. PATENT DOCUMENTS

| | | | |
|---|---|---|---|
| 2003/0231320 A1 | 12/2003 | Tsunekawa | |
| 2008/0270402 A1* | 10/2008 | Inoue | G06F 3/1212 |
| 2009/0195546 A1* | 8/2009 | Kawabuchi | H04N 21/00 |
| | | | 345/473 |
| 2010/0007902 A1* | 1/2010 | Kikuchi | G06F 3/1204 |
| | | | 358/1.9 |
| 2012/0081720 A1* | 4/2012 | Pandit | G06F 3/1206 |
| | | | 358/1.9 |
| 2012/0287476 A1 | 11/2012 | Sonogi | |

(Continued)

FOREIGN PATENT DOCUMENTS

| | | |
|---|---|---|
| JP | 4033857 B2 | 1/2008 |
| JP | 2012-226634 A | 11/2012 |

(Continued)

*Primary Examiner* — Gabriel I Garcia
(74) *Attorney, Agent, or Firm* — Canon U.S.A., Inc. IP Division

(57) ABSTRACT

An image forming apparatus includes a circuit configured to generate an image based on the PDL data, a generating unit configured to generate an image corresponding to at least part of a plurality of pages included in the PDL data, according to acquisition of the PDL data, a holding unit configured to hold the image generated by the generating unit into a storage, and an obtaining unit configured to obtain images of all pages to be printed among the pages included in the PDL data according to the print instruction from the user, wherein the obtaining unit instructs the circuit to skip image generation of a page of which an image is already generated by the generating unit among the pages to be printed, and instructs the circuit to perform image generation of a page of which an image is not generated by the unit configured to generate.

14 Claims, 17 Drawing Sheets

(56) References Cited

U.S. PATENT DOCUMENTS

2014/0211238 A1 7/2014 Nakajima et al.
2016/0196093 A1* 7/2016 Bandyopadhyay ... G06F 3/1215
                                                    358/1.15

FOREIGN PATENT DOCUMENTS

JP    2016-172370 A    9/2016
JP    2017-024321 A    2/2017

* cited by examiner

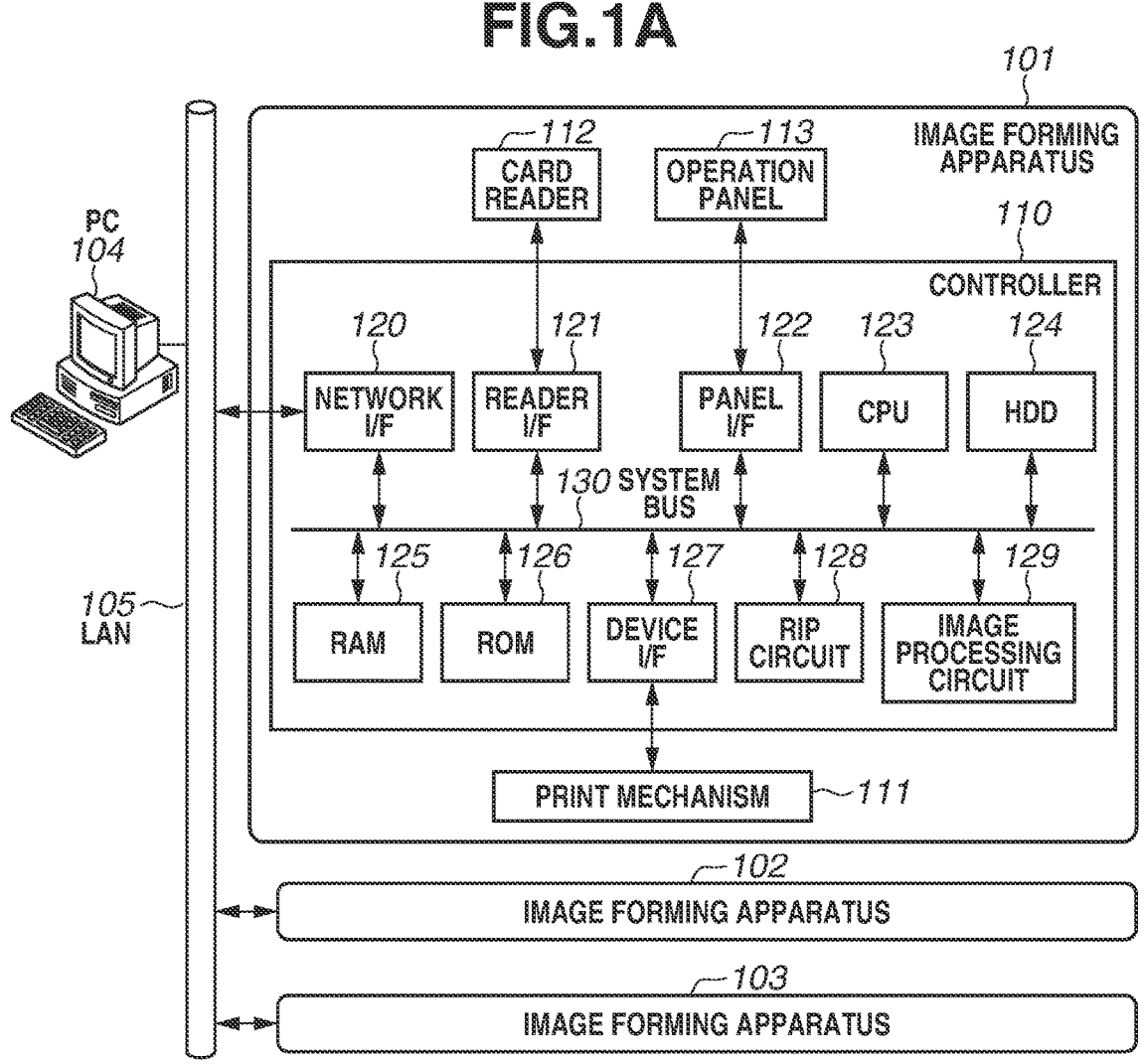
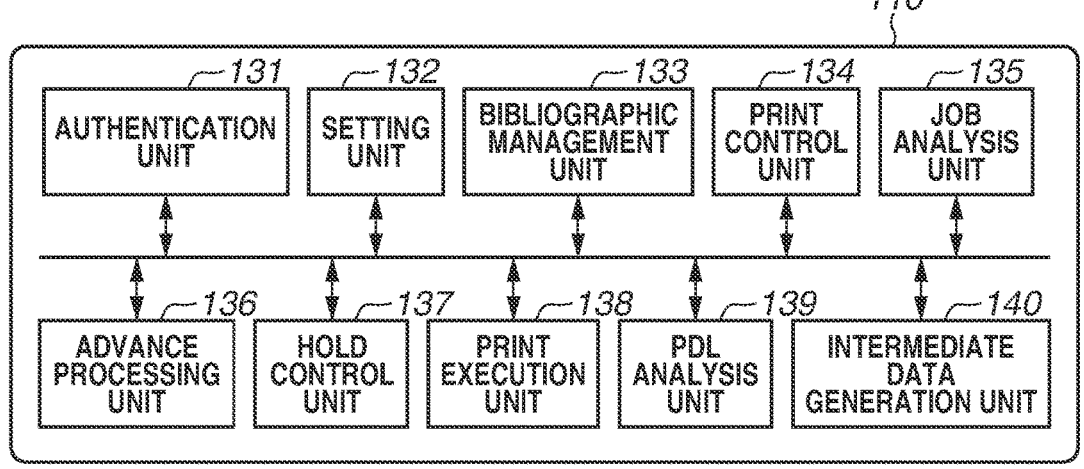

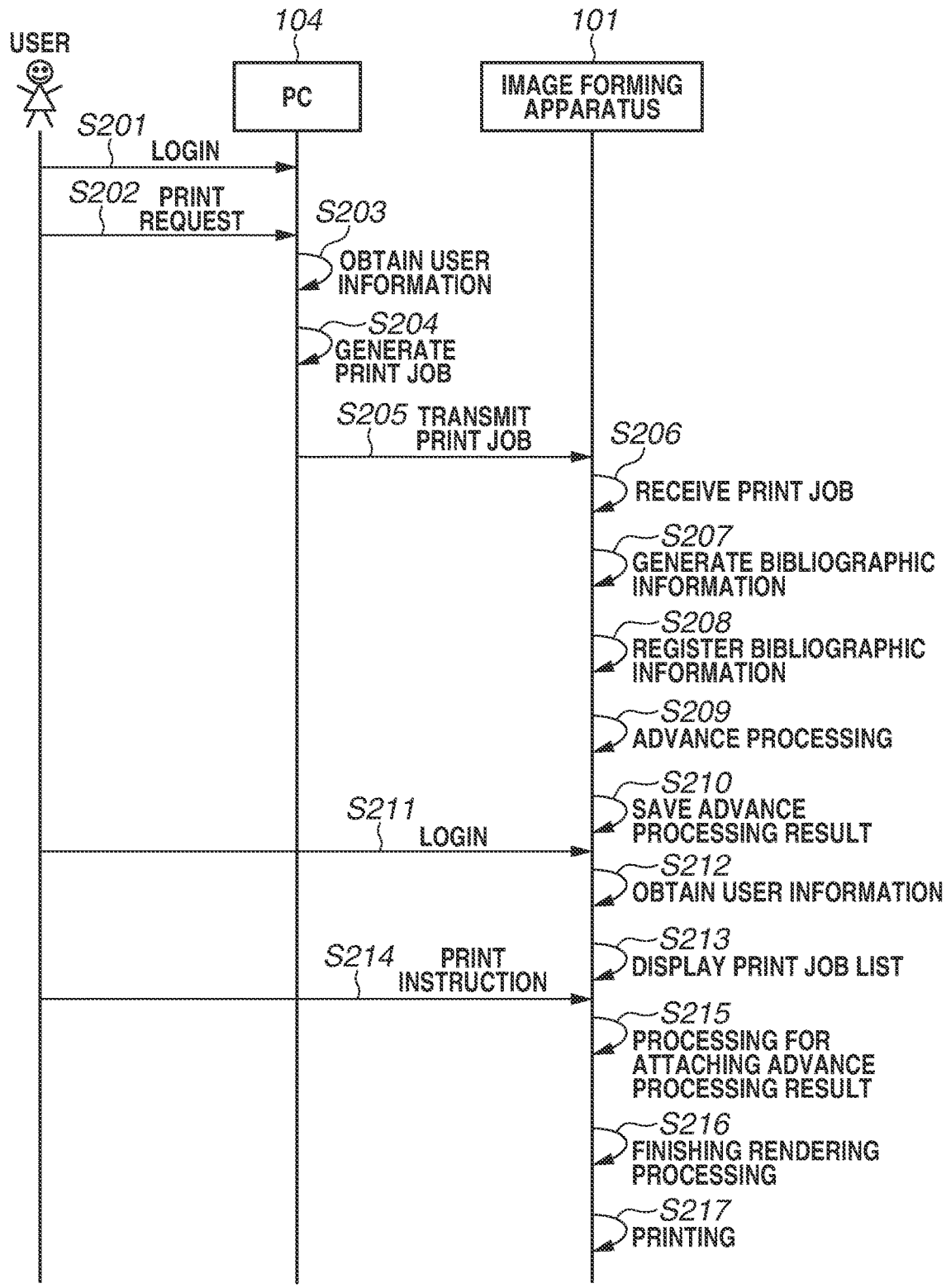

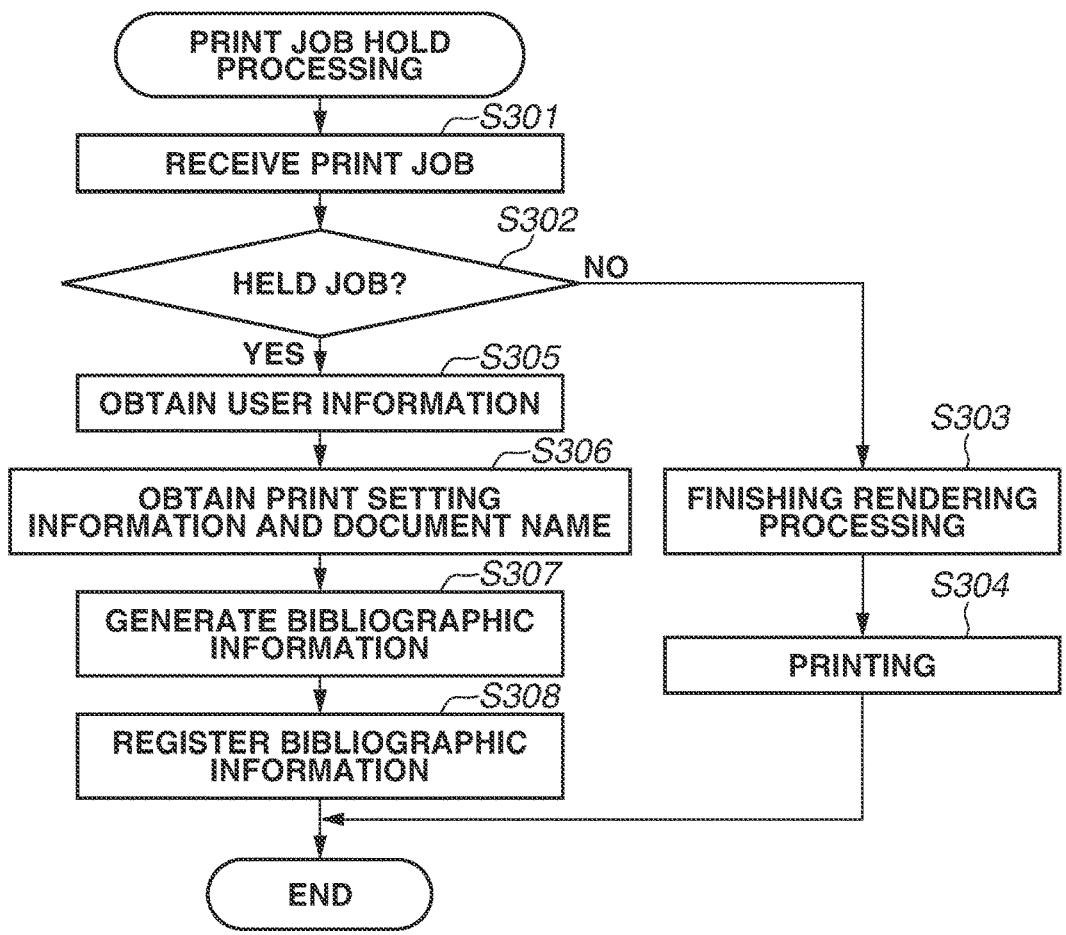

FIG. 3C

<USER A: BIBLIOGRAPHIC INFORMATION>

| JOB ID | FILE INFORMATION | PRINT SETTING INFORMATION | NUMBER OF PAGES | PREDICTED RENDERING TIME | ADVANCE PROCESSING INFORMATION |
|---|---|---|---|---|---|
| 1 | USERNAME: DOCUMENT1.pptx STORAGE LOCATION: 101 | COLOR MODE: MONOCHROME PRINT MODE: ONE-SIDED SHEET SIZE: A4 ... | 10 | 1page: 12.8 SECONDS 2page: 1.1 SECONDS ... 9page: 11.7 SECONDS 10page: 0.6 SECONDS | ADVANCE PROCESSING: DONE ADVANCE PROCESSING RESULT: /xx/yy/image1 /xx/yy/image9 |
| 2 | USERNAME: DOCUMENT2.xlsx STORAGE LOCATION: 101 | COLOR MODE: COLOR PRINT MODE: TWO-SIDED SHEET SIZE: A4 ... | 5 | 1page: 0.6 SECONDS 2page: 0.7 SECONDS 3page: 50.2 SECONDS 4page: 1.1 SECONDS 5page: 8.1 SECONDS | ADVANCE PROCESSING: NOT YET ADVANCE PROCESSING RESULT: ... |

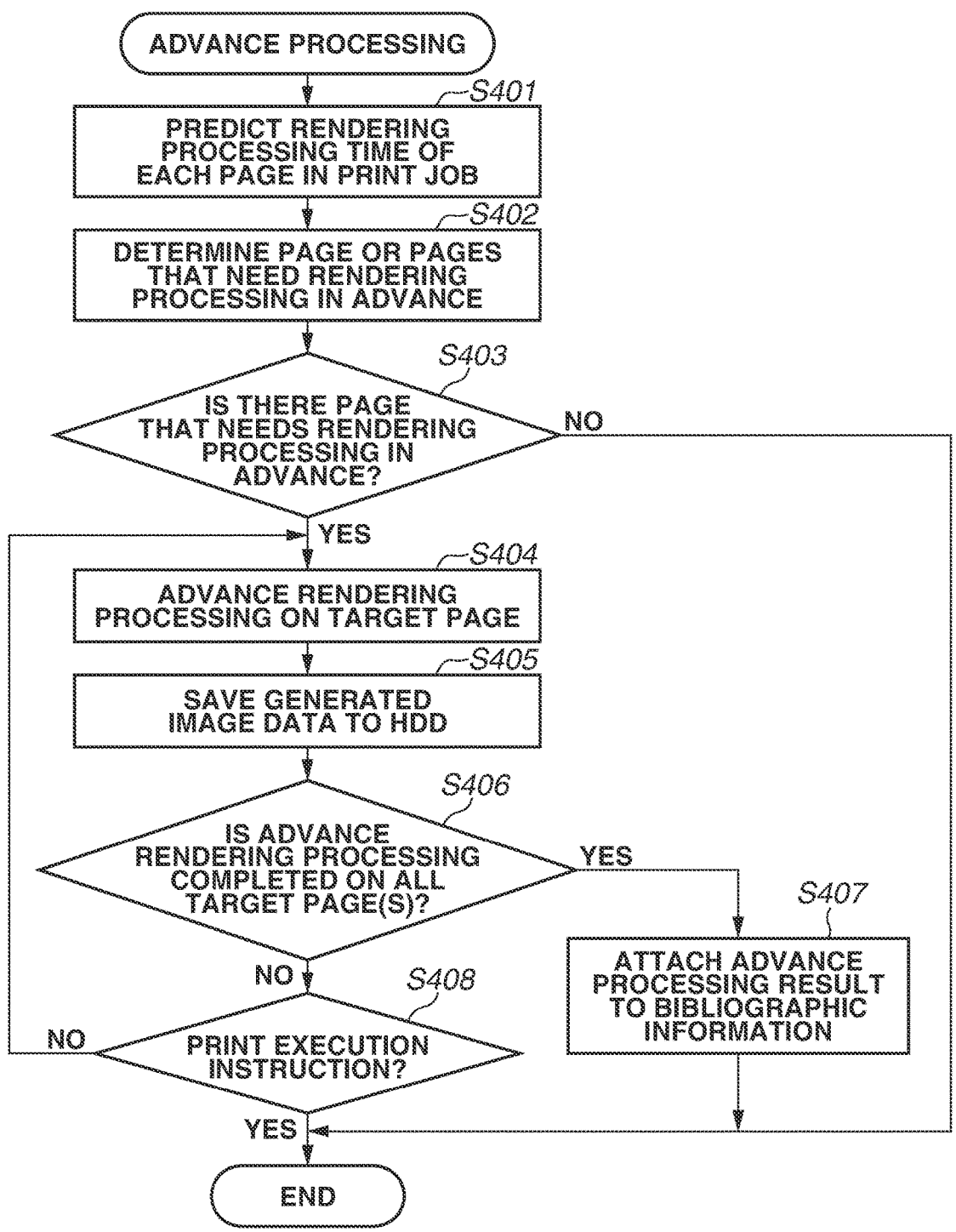

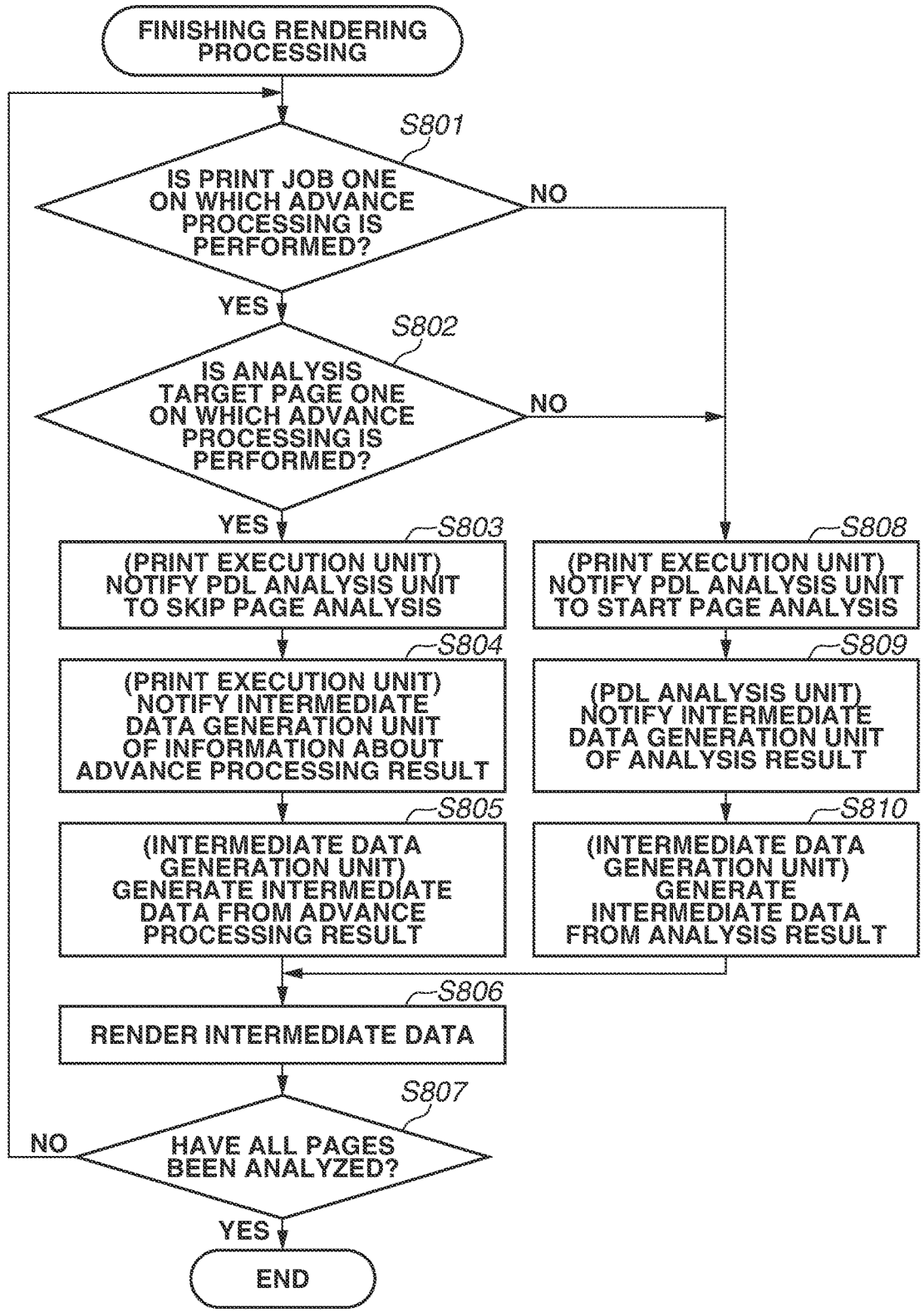

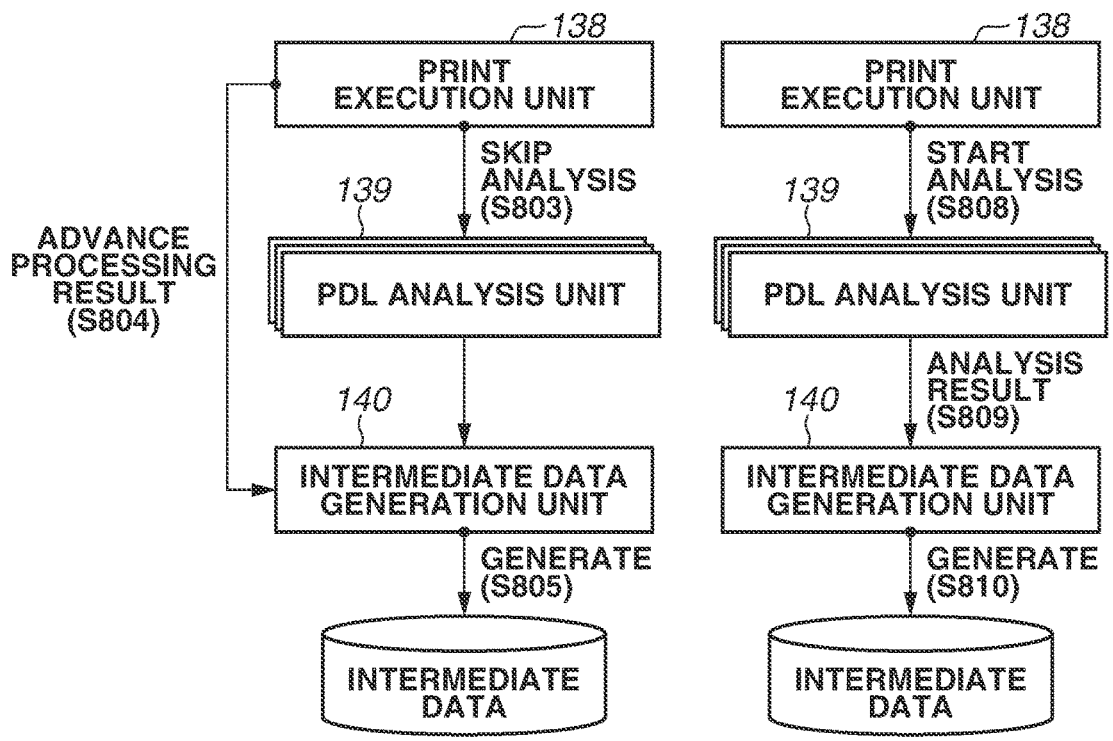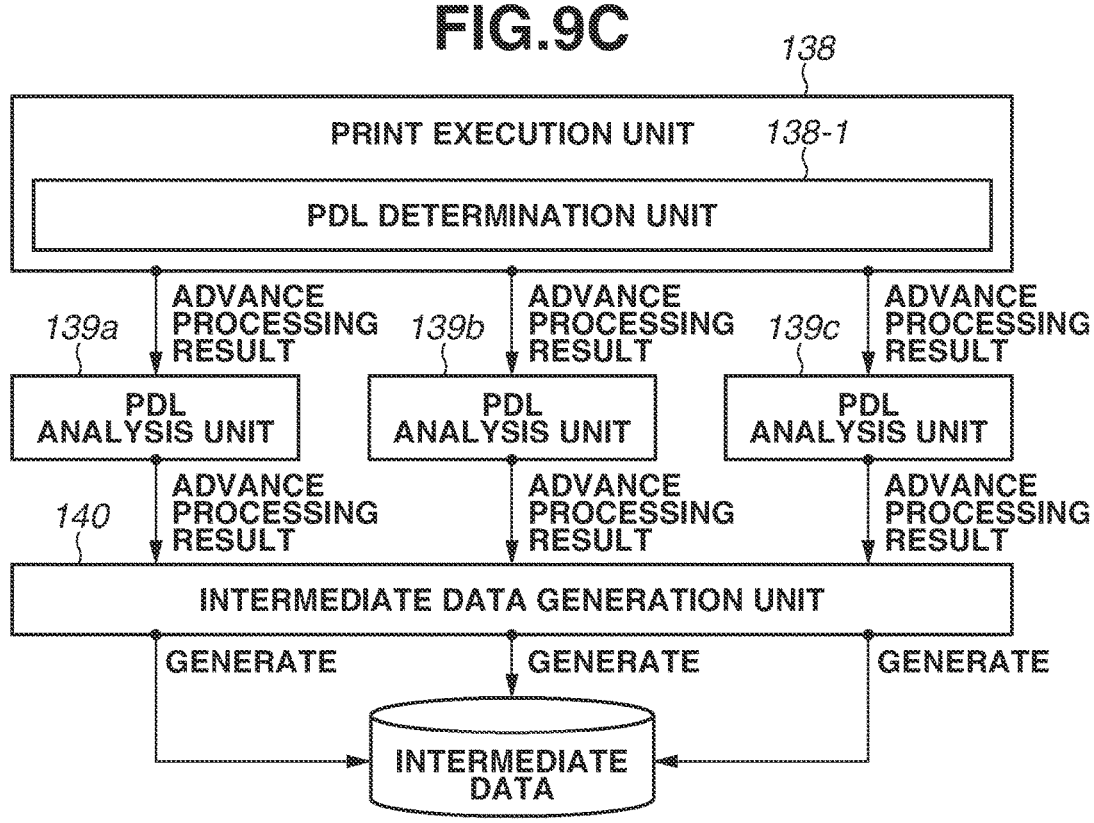

IMAGE FORMING APPARATUS AND METHOD FOR CONTROLLING IMAGE FORMING APPARATUS FOR REDUCING PRINT PROCESSING TIME

BACKGROUND OF THE INVENTION

Field of the Invention

The present invention relates to an image forming apparatus capable of once storing and then printing a print job, and more particularly to a control for reducing rendering processing time during execution of printing of the print job.

Description of the Related Art

As network environments become prevalent in recent years, it is becoming a common practice for a plurality of users to share a plurality of image forming apparatuses. As a result, demand for "hold printing" has been on the increase. "Hold printing" refers to performing user authentication on an image forming apparatus before executing printing so that a highly confidential print product can be output without being seen from other users.

Japanese Patent No. 4033857 discusses a technique for temporarily storing a print job transmitted from a host computer in an image forming apparatus having a server function, and executing printing of the stored print job by performing user authentication on the image forming apparatus.

According to the technique discussed in Japanese Patent No. 4033857, a series of print processes including rendering processing is started when a print instruction is accepted from a user after user authentication. This needs print waiting time from the print instruction to output of the print product. In view of usability, the print waiting time is desirably reduced.

SUMMARY OF THE INVENTION

Embodiments of the present invention are directed to providing an image forming apparatus that can reduce print processing time after a print instruction is given by a user, and suppress print waiting time in hold printing.

According to embodiments of the present invention, an image forming apparatus configured to form an image on a sheet, the image forming apparatus being capable of receiving page description language (PDL) data from an external apparatus and starting image formation based on the PDL data according to a print instruction from a user, includes a circuit configured to generate an image based on the PDL data, at least one controller being configured to function as a generating unit configured to generate an image corresponding to at least part of a plurality of pages included in the PDL data, according to acquisition of the PDL data, a holding unit configured to hold the image generated by the generating unit into a storage, and an obtaining unit configured to obtain images of all pages to be printed among the pages included in the PDL data according to the print instruction from the user, wherein the obtaining unit instructs the circuit to skip image generation of a page of which an image is already generated by the generating unit among the pages to be printed, and instructs the circuit to perform image generation of a page of which an image is not generated by the unit configured to generate.

Further features of the present invention will become apparent from the following description of exemplary embodiments with reference to the attached drawings.

BRIEF DESCRIPTION OF THE DRAWINGS

FIG. 1A is a configuration diagram of a printing system including image forming apparatuses according to an exemplary embodiment. FIG. 1B is a software configuration diagram of a controller which controls operation of an image forming apparatus.

FIG. 2 is a sequence diagram illustrating print processing according to a first exemplary embodiment.

FIGS. 3A, 3B, and 3C are diagrams for describing print job hold processing according to the first exemplary embodiment.

FIG. 4 is a flowchart for describing advance processing according to the first exemplary embodiment.

FIG. 8 is a flowchart for describing finishing rendering processing according to the first exemplary embodiment.

FIGS. 9A, 9B, and 9C are diagrams for describing the finishing rendering processing according to the first exemplary embodiment.

DESCRIPTION OF THE EMBODIMENTS

Figure 5:
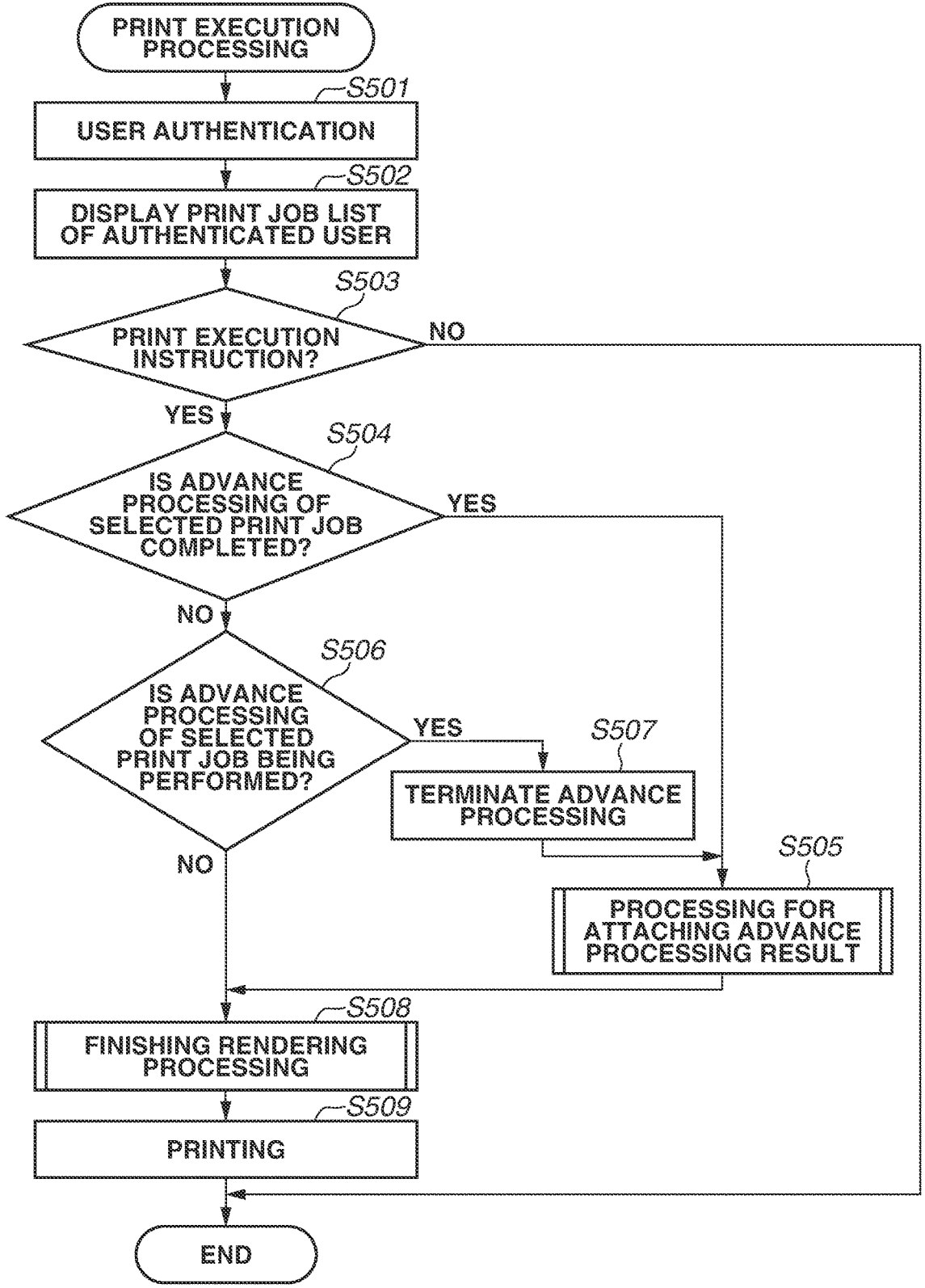
FIG. 5 is a flowchart for describing print execution processing according to the first exemplary embodiment.

A mode for carrying out embodiments of the present invention will be described below with reference to the drawings.

FIG. 1A is a diagram illustrating a configuration of a printing system including image forming apparatuses which are an exemplary embodiment of the present invention.

Image forming apparatuses 101 to 103 illustrated in FIG. 1A may be any of multi function printers (MFPs), single function printers (SFPs), and laser beam printers (LBPs). The image forming apparatuses 101 to 103 are any printing apparatuses capable of hold printing. The image forming apparatuses 101 to 103 can use any print method. While FIG. 1 illustrates a printing system with three image forming apparatuses as an example, the printing system may include one or more arbitrary image forming apparatuses.

The image forming apparatuses 101 to 103 are connected to a host computer (personal computer (PC)) 104, which issues various instructions, via a local area network (LAN) 105 such as Ethernet (registered trademark). The image forming apparatuses 101 to 103 perform processing according to the content of print instructions from the PC 104. Like the configuration illustrated in FIG. 1A, if a plurality of image forming apparatuses is connected via the LAN 105, one image forming apparatus can receive a print job from another image forming apparatus and perform print execution processing. Such a configuration will be described in a second exemplary embodiment.

Since the image forming apparatuses 101 to 103 have a similar configuration, the configuration of the image forming apparatus 101 will be described in a representative manner. A description of the configuration of the other image forming apparatuses 102 and 103 will be omitted. The configuration described below by using the image forming apparatus 101 also applies to the image forming apparatuses 102 and 103.

The image forming apparatus 101 includes a controller 110, a print mechanism 111, a card reader 112, and an operation panel 113. The controller 110 includes a network interface (I/F) 120, a reader I/F 121, a panel I/F 122, a central processing unit (CPU) 123, a hard disk drive (HDD) 124, a random access memory (RAM) 125, a read-only memory (ROM) 126, a device I/F 127, a raster image processor (RIP) circuit 128, and an image processing circuit 129 which are arranged on a system bus 130.

The controller 110 controls the entire image forming apparatus 101 according to a program stored in the ROM 126 or the HDD 124. The network I/F 120 is implemented by a LAN card, for example. The network I/F 120 connects to the LAN 105, and inputs and outputs information from/to an external apparatus.

The reader I/F 121 is an interface unit for the card reader 112 which receives authentication information from outside. The reader I/F 121 functions to receive and transmit authentication information input from outside to the CPU 123. The panel I/F 122 is an interface unit for the operation panel 113 which includes a display screen capable of displaying, for example, various menus and print job information. The panel I/F 122 outputs operation screen data to the operation panel 113. The panel I/F 122 also functions to transmit information input from the operation panel 113 by an operator to the CPU 123.

The CPU 123 is a CPU for controlling the entire image forming apparatus 101. The HDD 124 is a storage device, such as an HDD and a solid state drive. The HDD 124 stores system software for various types of processing, and input print jobs and image data. The RAM 125 is a system work memory intended for operation of the CPU 123, and also serves as an image memory for temporarily storing input print jobs and image data. The ROM 126 is a boot ROM and stores a boot program of the printing system. The CPU 123 implements various controls by reading the programs stored in the ROM 126 or the HDD 124 into the RAM 125 and executing the programs according to need.

The device I/F 127 connects the print mechanism 111 and the controller 110, and performs conversion between synchronous and asynchronous systems of image data. The RIP circuit 128 analyzes and rasterizes intermediate data (display list) into an image. The image processing circuit 129 performs processing on image data generated by analyzing a print job. Examples of the processing include correction and resolution conversion according to the print mechanism 111.

The print mechanism 111 executes printing according to instructions from the controller 110. More specifically, the print mechanism 111 forms an image on a sheet (such as recording paper) based on print data. The card reader 112 has a function capable of reading information from an identification (ID) card that a user has. The card reader 112 notifies the controller 110 of user information read from the ID card. The operation panel 113 receives the operation screen data from the controller 110, displays the received operation screen data, receives operation instructions from the user, and notifies the controller 110 of the operation instructions.

FIG. 1B is a diagram illustrating a software configuration of the controller 110 which controls operation of the image forming apparatuses 101 to 103.

The controller 110 implements an authentication unit 131, a setting unit 132, a bibliographic management unit 133, a print control unit 134, a job analysis unit 135, an advance processing unit 136, a hold control unit 137, a print execution unit 138, a PDL analysis unit 139, and an intermediate data generation unit 140 as software. In other words, such units 131 to 140 are functional units implemented by the CPU 123 reading the programs stored in the ROM 126 or the HDD 124 into the RAM 125 and executing the programs according to need.

The authentication unit 131 receives authentication information from the reader I/F 121 (or operation panel 113) via the system bus 130, and notifies the hold control unit 137 of the authentication information. The setting unit 132 controls input and output of the panel I/F 122 from/to the operation panel 113 via the system bus 130.

The bibliographic management unit 133 controls and manages a print job received by the hold control unit 137 and information about the print job. The print control unit 134 obtains a print instruction and information about a print job that are input via the network I/F 120, and instructs the hold control unit 137 and the print execution unit 138 to process the print job.

The hold control unit 137 analyzes and manages the print job received from the print control unit 134, controls advance processing, and issues a print instruction to the print execution unit 138. The job analysis unit 135 analyzes the print job received by the hold control unit 137. The advance processing unit 136 performs rendering processing on the print job received by the hold control unit 137 according to the result of analysis of the print job by the job analysis unit 135.

The print execution unit 138 controls the PDL analysis unit 139, the intermediate data generation unit 140, the RIP circuit 128, and the image processing circuit 129 to generate an image with respect to a print job received from the print control unit 134 or the hold control unit 137. The print execution unit 138 further outputs the generated image to the print mechanism 111 via the device I/F 127, and causes the print mechanism 111 to perform print processing. The PDL analysis unit 139 performs a PDL analysis on the print job instructed by the print execution unit 138. The intermediate data generation unit 140 generates intermediate data based on information analyzed by the PDL analysis unit 139.

FIG. 2 illustrates an example of a sequence when the printing system including the image forming apparatuses 101 to 103 according to the first exemplary embodiment receives a print job from the PC 104 and prints the print job by the image forming apparatus 101. In the diagram, steps are denoted by an "S". The processing that the image forming apparatus 101 performs in FIG. 2 is implemented by the CPU 123 of the image forming apparatus 101 reading the programs stored in the ROM 126 or the HDD 124 into the RAM 125 and executing the programs according to need. The processing that the PC 104 performs in FIG. 2 is implemented by a not-illustrated CPU of the PC 104 reading programs stored in an HDD into a RAM and executing the programs according to need.

In step S201, the user logs in to the PC 104. In step S202, the user operates the PC 104 to request printing of data from an arbitrary application. In step S203, the PC 104 initially obtains user information. In step S204, the PC 104 generates a print job by attaching the user information obtained in the foregoing step S203 thereto. In step S205, the PC 104 transmits the print job to the image forming apparatus 101.

In step S206, the image forming apparatus 101 receives and stores the print job into the HDD 124. In step S207, the image forming apparatus 101 extracts the user information attached to the print job, and generates bibliographic information. In step S208, the image forming apparatus 101 saves (registers) the bibliographic information to the HDD 124. In step S209, the image forming apparatus 101 having saved the bibliographic information starts advance processing. In step S210, the image forming apparatus 101 saves the result of the advance processing (advance processing result) to the HDD 124 in succession.

In step S211, the user logs in to the image forming apparatus 101. In step S212, the image processing apparatus 101 obtains the user information about the user. In step S213, the image processing apparatus 101 displays a print job list of the user on the operation panel 113 based on the bibliographic information about the user.

In step S214, the image forming apparatus 101 receives a print instruction from the user. In step S215, the image forming apparatus 101 attaches, to the print job, the result of the advance processing which is saved in the foregoing step S210. Details of the attachment of the result of the advance processing to the print job will be described below. In step S216, the image forming apparatus 101 performs finishing rendering processing by using the advance processing result of the print job to which the advance processing result is attached. In step S217, the image forming apparatus 101 performs printing.

FIGS. 3A to 3C are diagrams illustrating print job hold processing to be performed by the software (133 to 140) of the controller 110 included in the image forming apparatuses 101 to 103 according to the first exemplary embodiment.

FIG. 3A is a flowchart for describing an example of the print job hold processing performed by the controller 110. FIG. 3B is a diagram for describing an example of a configuration of a print job received by the image forming apparatus 101. FIG. 3C is a diagram for describing an example of a user's print job list which the controller 110 stores in the HDD 124. The processing illustrated in FIG. 3A and FIGS. 4, 5, 6, and 8 to be described below is implemented by the CPU 123 reading the programs stored in the ROM 126 or the HDD 124 into the RAM 125 and executing the programs according to need.

In step S301, the print control unit 134 receives a print job transmitted from the PC 104 via the network I/F 120. For example, the print job is configured as illustrated in FIG. 3B. Header information including various types of setting information comes at the beginning of data. Data (PDL data) on each page follows the header information. "P1", "Line1", "Text1", "Rect1", "Image1", and "Rect2" included in information on each page are examples of drawing commands for page composition.

In step S302, the print control unit 134 determines whether the print job received in the foregoing step S301 is a "hold job" or a "job to be simply printed". Whether the print job is a "hold job" is determined by referring to whether a parameter stored in the image forming apparatus 101 indicates hold or by analyzing information embedded in the header of the print job. Details of such conventional methods will be omitted.

In step S302, in a case where the print job is determined to be a "job to be simply printed" (NO in step S302), the processing proceeds to step S303.

In step S303, the print control unit 134 instructs the print execution unit 138 to process the print job. The print execution unit 138 controls the PDL analysis unit 139 and the intermediate data generation unit 140 to analyze the print job and generate intermediate data, and makes the RIP circuit 128 perform rendering processing on the generated intermediate data to generate image data.

In step S304, the print execution unit 138 performs image correction on the image data generated in the foregoing step S303 by using the image processing circuit 129, and then transfers the image data to the print mechanism 111 via the device I/F 127, whereby printing is executed.

On the other hand, in a case where, in step S302, the print job is determined to be a "hold job" (YES in step S302), the processing proceeds to step S305.

In step S305, the print control unit 134 instructs the hold control unit 137 to process the print job. The hold control unit 137 obtains user information included in the print job. In the example of FIG. 3B, the user information is illustrated to be "USERNAME: USER A". The user information does not need to be included in the header information about the print job, and can be separately transmitted from the source PC 104. Any information from which the user who executes the printing can be identified may be used as the user information. Examples include a username and a user ID.

In step S306, the hold control unit 137 instructs the job analysis unit 135 to analyze the print job. The job analysis unit 135 obtains print setting information, a document name, and other information (including the number of pages, for example) included in the print job. The print setting information includes, for example, information indicating whether one-sided printing or two-sided printing, information about whether to print in color or monochrome, and information about the size of a sheet to be output. FIG. 3B illustrates an example of such print setting information. Print data with some of the print setting information missing is also applicable. In such a case, initial setting values stored in the HDD 124 or ROM 126 can be used. The print setting information can be set by the user when printing is executed.

In step S307, the hold control unit 137 associates the user information obtained in the foregoing step S305 with the print setting information, the document name, and other information obtained in the foregoing step S306. The hold control unit 137 then generates bibliographic information corresponding to the user information (for example, FIG. 3C), with the associated pieces of information as one record. A storage location included in file information includes information that identifies the image forming apparatus 101 itself which performs this processing.

FIG. 3C is a diagram illustrating an example of user-by-user bibliographic information according to the present exemplary embodiment.

Bibliographic information about user A will be described as an example. The bibliographic information according to the present exemplary embodiment includes, for example, a job ID, file information, print setting information, the number of pages, predicted rendering times, and advance processing information. A value unique to each job is set as the job ID.

In step S308, the hold control unit 137 instructs the bibliographic management unit 133 to register the bibliographic information to which one record is added in the foregoing step S307. The bibliographic management unit 133 saves (registers) the bibliographic information to which one record is added in step S307 to the HDD 124. The hold control unit 137 also saves the print job to the HDD 124 as the one corresponding to the record that is added this time. At the time of registration of the bibliographic information in step S308, predicted rendering times are not set. The advance processing information is registered in a state such that the advance processing is "not yet" and the advance processing result is not set.

FIG. 4 is a flowchart for describing an example of the advance processing to be performed by the software (for example, 135 and 136) of the controller 110 included in the image forming apparatuses 101 to 103 according to the first exemplary embodiment. The advance processing of FIG. 4 is processing to be performed after a print job is held in the HDD 124 by the print job hold processing of FIG. 3A.

In step S401, the job analysis unit 135 predicts time needed for the rendering processing of each page included in the print job held in the HDD 124. The time can be predicted by a method capable of estimating rendering processing time from the size of the print job and/or the content of the PDL commands included in the print job. The job analysis unit 135 instructs the bibliographic management unit 133 to register the result of prediction into the bibliographic information associated with the print job on which the advance processing is being performed.

In step S402, the advance processing unit 136 determines, based on the result of prediction in the foregoing step S401, a page or pages that need long time for rendering processing among the pages included in the print job as a page or pages on which the rendering processing needs to be performed in advance. For example, suppose that predicted rendering times of a document with "job ID: 1" are as illustrated in FIG. 3C. In such a case, the advance processing unit 136 determines that time-consuming pages are 1 page and 9 page. The time-consuming pages can be determined according to printing speed of the image forming apparatus 101 that prints the pages, or based on a threshold (for example, "10 seconds") stored in the advance processing unit 136. All the pages may be determined to need rendering. In other words, the advance processing unit 136 predicts the time needed for rendering from the PDL data included in the print job page by page, and determines a page or pages to perform the advance processing based on the result of prediction. The predicted rendering time can be obtained, for example, based on the size of the PDL data on the page to be predicted, or based on the number or types of PDL commands included in the page. Other methods can be used for prediction.

In step S403, the advance processing unit 136 determines, based on the determination in the foregoing step S402, whether there is a page that needs rendering processing in advance. In a case where there is determined to be no page that needs rendering processing in advance (NO in step S403), the processing of the present flowchart ends.

On the other hand, in a case where there is determined to be a page that needs rendering processing in advance (YES in step S403), the processing proceeds to step S404. Here, information "in process" indicating that the advance processing is currently performed may be attached to the advance processing information in the corresponding bibliographic information.

In step S404, the advance processing unit 136 performs rendering processing (advance rendering processing) on the page(s) determined to need rendering processing in advance in the foregoing step S402 to generate image data. If there is a plurality of pages determined to need rendering processing in advance in the foregoing step S402, the advance processing unit 136 can perform the rendering processing in order of the pages in the print job. The advance processing unit 136 can perform the rendering processing on the pages in descending order of the time needed for the rendering processing. The advance processing unit 136 can perform the rendering processing on the pages in ascending order of the time needed for the rendering processing.

In step S405, the advance processing unit 136 saves the image data generated in the foregoing step S404 into the HDD 124 page by page. The advance processing unit 136 associates the saved page-by-page image data with the bibliographic information associated with the print job on which the advance processing is currently performed, and manages the image data to allow correspondence with the pages of the print job.

In step S406, the advance processing unit 136 determines whether the advance rendering processing is completed on all the page(s) (target page(s)) determined to need rendering processing in advance in the foregoing step S402. In a case where the advance rendering processing is determined to not be completed on all the target page(s) (NO in step S406), the processing proceeds to step S408.

In step S408, the advance processing unit 136 determines whether there is a print execution instruction from the user for the print job on which the rendering processing is currently performed. In a case where there is determined to be no print execution instruction (NO in step S408), the processing returns to step S404.

On the other hand, in a case where there is determined to be a print execution instruction (YES in step S408), the advance processing unit 136 terminates the advance processing and the processing of the present flowchart ends. The print execution instruction will be described in detail with reference to FIG. 5 to be described below.

In a case where the advance rendering processing is determined to be completed on all the target page(s) (YES in step S406), the processing proceeds to step S407.

In step S407, the advance processing unit 136 instructs the bibliographic management unit 133 to attach the saved information about the result of the advance rendering processing in the foregoing step S405 to the corresponding bibliographic information. For example, like the advance processing information in the bibliographic information of FIG. 3C, the bibliographic management unit 133 attaches information "done" indicating whether the advance processing is done and information "/xx/yy/image1" and "/xx/yy/image9" about where the advance processing result is stored. After step S407, the processing of the present flowchart ends.

FIG. 5 is a flowchart for describing an example of the print execution processing to be performed by the software (131, 132, and 138) of the controller 110 included in the image forming apparatuses 101 to 103 according to the first exemplary embodiment.

Figure 16:
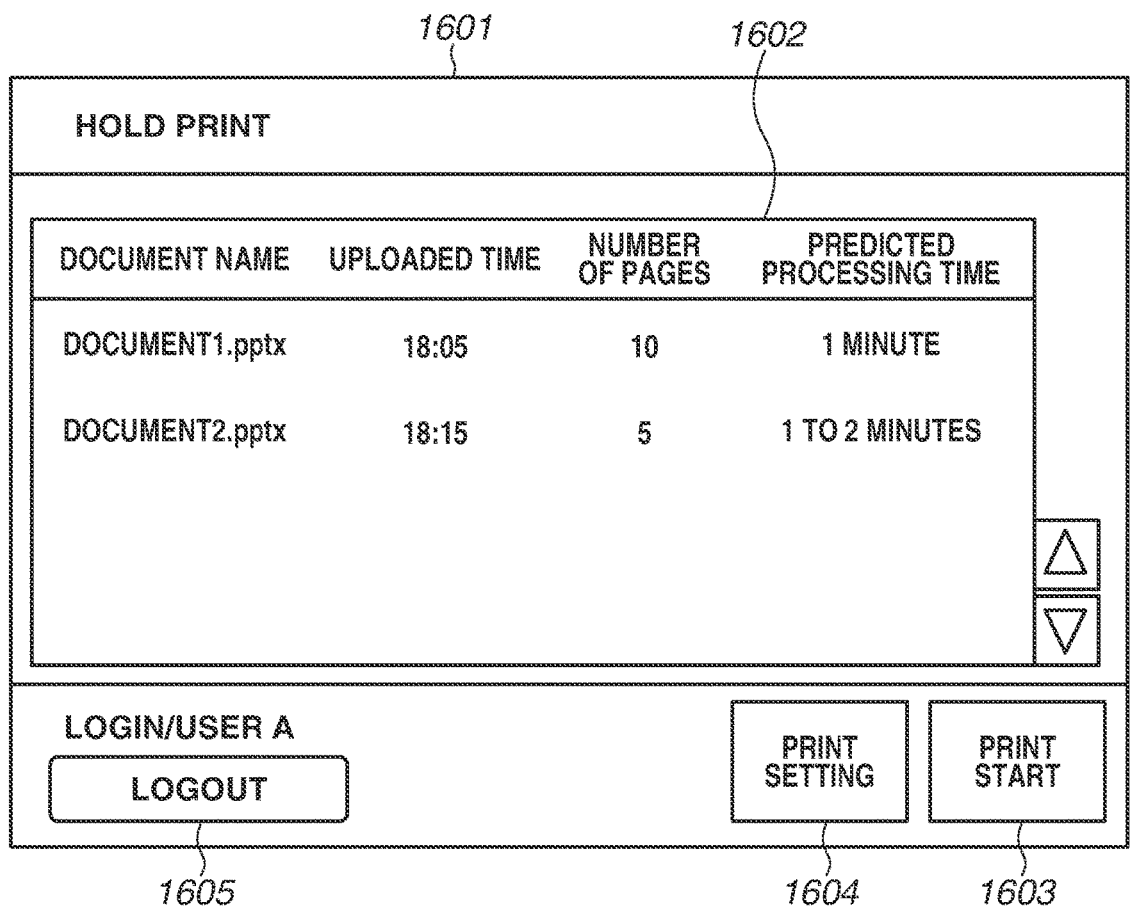
FIG. 16 is a diagram for describing an example of a user interface (UI) displayed on an operation panel after user authentication.

FIG. 16 is a diagram for describing an example of a user interface (UI) displayed on the operation panel 113 after user authentication.

In step S501, the user holds his/her ID card over the card reader 112, and the card reader 112 reads user information from the ID card. The authentication unit 131 receives the user information via the reader I/F 121, and performs authentication processing. While the user information is described to be read from the ID card of the user, conventional authentication methods can be used. For example, the user can input the user information and password from the operation panel 113 or the like for user authentication. If the authentication processing is successful, the authentication unit 131 notifies the setting unit 132 of the user information.

In step S502, the setting unit 132 receives bibliographic information corresponding to the same user information as that obtained in the foregoing step S501 from the bibliographic management unit 133. The setting unit 132 generates a print job list based on the bibliographic information, and displays the print job list on the operation panel 113 via the panel I/F 122. FIG. 16 illustrates an example of information 1601 displayed on the operation panel 113, and an example of a print job list 1602 displayed. The user can issue a print instruction for a desired print job by selecting the print job from the print job list 1602 and pressing a print start button 1603. The user can change print settings of a desired print job by selecting the print job from the print job list 1602 and pressing a print setting button 1604. A logout button 1605 is intended for logout.

In step S503, the setting unit 132 determines whether a print execution instruction for a print job displayed on the print job list 1602 is issued by the user. For example, in a case where the user selects a print job from the print job list 1602 and presses the print start button 1603, the setting unit 132 determines that a print execution instruction is issued. For example, in a case where the user presses the logout button 1605 without pressing the print start button 1603, the setting unit 132 determines that no print execution instruction is issued.

In a case where a print execution instruction is determined to not be issued (NO in step S503), the processing of the present flowchart ends.

On the other hand, in a case where a print execution instruction is determined to be issued (YES in step S503), the processing proceeds to step S504.

In step S504, the setting unit 132 notifies the hold control unit 137 that a print execution instruction is issued. The hold control unit 137 determines whether the advance processing of the print job for which the print execution instruction is issued is completed. The hold control unit 137 makes the determination by referring to the bibliographic information, attached in step S407 of FIG. 4, to obtain the information about whether the advance processing is completed.

In step S504, in a case where the advance processing of the print job is determined to be completed (YES in step S504), the processing proceeds to step S505.

Figure 6:
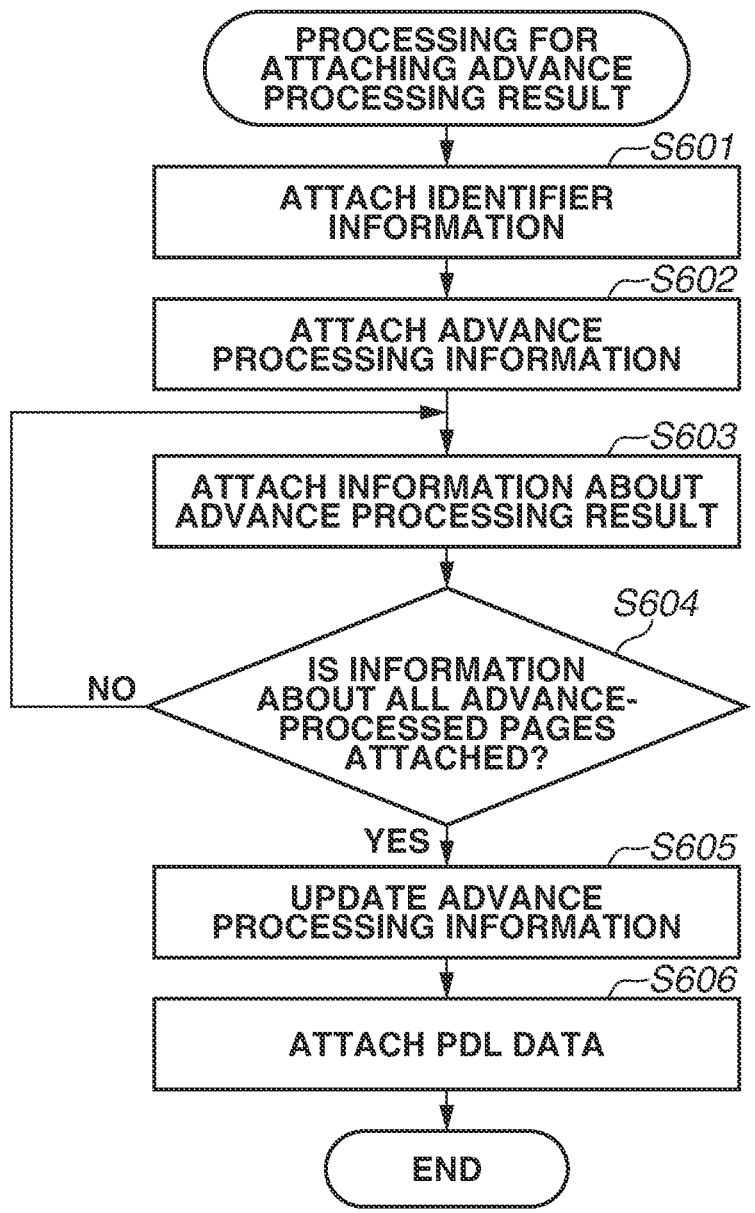
FIG. 6 is a flowchart for describing processing for attaching an advance processing result according to the first exemplary embodiment.

In step S505, the hold control unit 137 performs processing for attaching information about the advance processing result to the PDL data to generate a print job. Details of the processing for attaching the advance processing result will be described below (FIG. 6). After step S505, the hold control unit 137 instructs the print execution unit 138 to print the print job. According to the instruction, the print execution unit 138 performs the processing of step S508.

In step S504, in a case where the advance processing of the print job is determined to not be completed (NO in step S504), the processing proceeds to step S506.

In step S506, the hold control unit 137 determines whether the advance processing of the print job for which the print execution instruction is issued is being performed. Like the foregoing step S504, the hold control unit 137 may make the determination by referring to the bibliographic information and determining whether the advance processing is being performed. Alternatively, the hold control unit 137 may make the determination depending on whether there is image data, on which the advance rendering processing is completed, associated with the bibliographic information in step S405 of FIG. 4.

In step S506, in a case where the advance processing of the print job for which the print execution instruction is issued is determined to be being performed (YES in step S506), the processing proceeds to step S507.

In step S507, the hold control unit 137 terminates the advance processing of the print job currently subjected to the advance processing. Information about the termination of the advance processing is notified to the advance processing unit 136 and used to make the determination whether there is a print execution instruction, described in step S408 of FIG. 4. After the foregoing step S507, the hold control unit 137 obtains the advance processing result (image data associated with the corresponding bibliographic information in step S405 of FIG. 4) saved to the HDD 124 at the time of termination of the advance processing as advance processing information. In step S505, the hold control unit 137 attaches the advance processing information to the print job. After step S505, the hold control unit 137 instructs the print execution unit 138 to print the print job. According to the instruction, the print execution unit 138 performs the processing of step S508.

In step S506, in a case where the advance processing of the print job for which the print execution instruction is issued is determined to not be currently performed (NO in step S506), the processing proceeds to step S508. Then, the hold control unit 137 instructs the print execution unit 138 to print the print job. According to the instruction, the print execution unit 138 performs the processing of step S508.

In step S508, the print execution unit 138 performs finishing rendering processing. If no information about the advance processing result is attached to the print job, the finishing rendering processing is similar to the processing of step S303 in FIG. 3A. Details of the finishing rendering processing in a case where information about the advance processing result is attached to the print job are illustrated in FIG. 8 to be described below.

In step S509, the hold control unit 137 instructs the print execution unit 138 to execute printing, and the print execution unit 138 executes printing. The execution of the printing by the print execution unit 138 is similar to the processing of step S304 in FIG. 3A. After step S509, the processing of the present flowchart ends.

FIG. 6 is a flowchart for describing an example of the processing for attaching the advance processing result (step S505 of FIG. 5) to be performed by the hold control unit 137 of the controller 110 included in the image forming apparatuses 101 to 103 according to the first exemplary embodiment.

Figure 7:
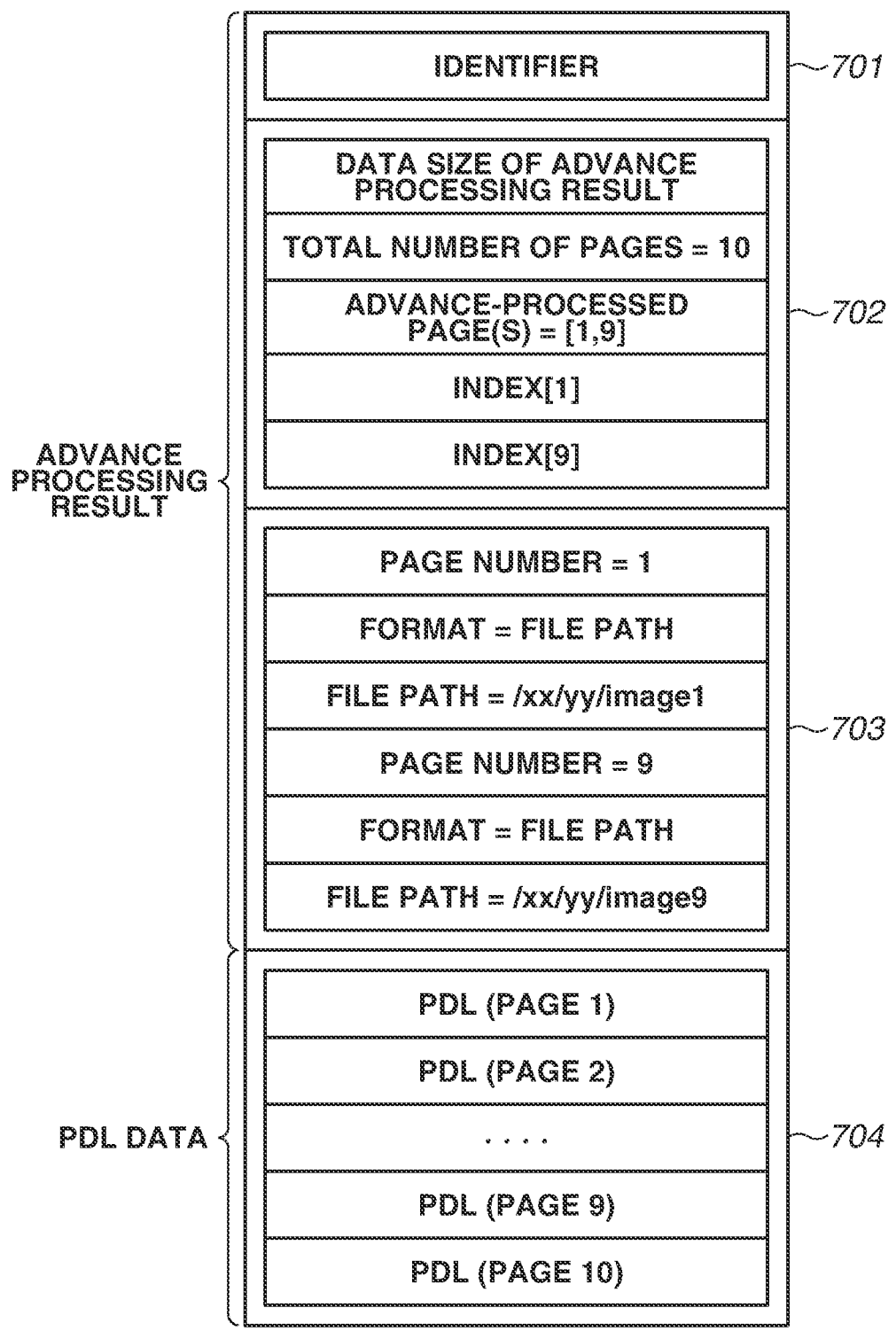
FIG. 7 is a diagram for describing an example of a print job after attachment of the advance processing result according to the first exemplary embodiment.

FIG. 7 is a diagram for describing an example of the advance processing result attached to the PDL data by the processing for attaching the advance processing result according to the first exemplary embodiment.

In step S601, the hold control unit 137 attaches identifier information (701 in FIG. 7) to the PDL data at the beginning of the processing for attaching the advance processing result. The identifier information represents information to which advance processing result is attached. The identifier information may be a character string, a numerical value, or any information that is identifiable inside the controller 110.

In step S602, the hold control unit 137 attaches advance processing information (702 in FIG. 7) after the identification information attached in the foregoing step S601. The advance processing information includes the data size of the entire advance processing result, the total number of pages of the target print job, and information about advance-processed pages. Some of the pieces of information may be unknown until processing to be described below is performed. Examples include the data size of the entire advance processing result and index information indicating the information about the advance processing result. For such information, only areas for storing the information are reserved, and the information is updated after the processing to be described below. The configuration of the advance processing information 702 in FIG. 7 is just an example. Any configuration can be employed as long as all information needed to analyze the information about the advance processing result is included.

In step S603, the hold control unit 137 attaches the information about the advance processing result (703 in FIG. 7) after the advance processing information attached in the foregoing step S602. Here, the information is attached with a piece of information indicating a page number of the advance processing result, a piece of information indicating a format, and a piece of information indicating the information about the advance processing result as a set. In the case of the information 703, a set of pieces of information about the first page is initially attached. The format of the advance processing result is a "file path". If the format is a "file path", the hold control unit 137 attaches file path information about the HDD 124 in which the advance processing result is stored (information for identifying the storage location of the advance processing result) as the information about the advance processing result.

In step S604, the hold control unit 137 determines whether information about all advance-processed pages is attached. In a case where the information about all the advance-processed pages is determined to not be attached yet (NO in step S604), the processing returns to step S603. The processing then proceeds to the next page.

On the other hand, in a case where the information about all the advance-processed pages is determined to be attached (YES in step S604), the processing proceeds to step S605.

In step S605, the hold control unit 137 updates the advance processing information generated in the foregoing step S602. The areas reserved in advance for, for example, the data size of the entire advance processing result and the index information indicating the information about the advance processing result are overwritten and updated with the information after the end of the processing.

In step S606, the hold control unit 137 attaches PDL data (704 in FIG. 7) after the advance processing result (701, 702, and 703) generated in the foregoing steps S601 to S605. As illustrated by the PDL data 704, unprocessed original PDL data is attached. In step S606, the hold control unit 137 thus generates a print job in which the advance processing result and the PDL data are combined as illustrated in FIG. 7. After step S606, the processing of the present flowchart ends.

The finishing rendering processing (step S508 of FIG. 5) will be described below with reference to FIGS. 8, 9A, 9B, and 9C.

FIG. 8 is a flowchart for describing an example of the finishing rendering processing (step S508 of FIG. 5) to be performed by the software (138 to 140) of the controller 110 included in the image forming apparatuses 101 to 103 according to the first exemplary embodiment.

FIGS. 9A, 9B, and 9C are diagrams for describing examples of a software module configuration of the print execution unit 138, the PDL analysis unit 139, and the intermediate data generation unit 140.

In step S801, the print execution unit 138 analyzes the print job received from the print control unit 134 or the hold control unit 137, and determines whether the print job is one on which the advance processing is performed. In a case where the print job includes the identifier information (701 in FIG. 7), the print execution unit 138 determines that the print job is one on which the advance processing is performed (YES in step S801). The processing then proceeds to step S802. On the other hand, in a case where there is no identifier information (701 in FIG. 7), the print execution unit 138 determines that the print job is one on which the advance processing is not performed (NO in step S801). The processing then proceeds to step S808.

In step S802, the print execution unit 138 determines whether an analysis target page that is going to be analyzed is a page on which the advance processing is performed. In a case where the analysis target page is included in the advance processing information (702 in FIG. 7) about the print job, the print execution unit 138 determines that the analysis target page is one on which the advance processing is performed (YES in step S802). The processing then proceeds to step S803.

On the other hand, in a case where the analysis target page is not included in the advance processing information (702 in FIG. 7) about the print job, the print execution unit 138 determines that the analysis target page is not one on which the advance processing is performed (NO in step S802). The processing then proceeds to step S808.

In the case of the print job illustrated in FIG. 7, the advance processing information 702 includes page 1 and page 9. The print execution unit 138 thus determines that page 1 and page 9 are pages on which the advance processing is performed.

The processing of steps S803 to S805 will be described below with reference to FIG. 9A.

In step S803, the print execution unit 138 notifies the PDL analysis unit 139 to "skip" a page analysis. The PDL analysis unit 139 notified to skip a page analysis skips analysis processing of the analysis target page, and prepares for analysis processing of the next page without issuing a notification to the intermediate data generation unit 140. The print execution unit 138 notifies the PDL analysis unit 139 to "skip" a page analysis for the purpose of improving the performance of the print processing. If the print execution unit 138 notifies the PDL analysis unit 139 to "start" a page analysis, not "skip", the PDL analysis unit 139 repeats the analysis processing performed by the advance processing unit 136 in the advance processing.

In step S804, the print execution unit 138 notifies the intermediate data generation unit 140 of the information about the advance processing result (703 in FIG. 7) of the analysis target page.

In the case of the print job illustrated in FIG. 7, if the analysis target page of the print execution unit 138 is page 1, the print execution unit 138 notifies the intermediate data generation unit 140 of the advance processing result (RIP image of page 1) stored in the file path "/xx/yy/image1".

That the print execution unit 138 notifies the intermediate data generation unit 140 of the advance processing result without the intermediary of the PDL analysis unit 139 has two advantages. The first advantage is that the processing steps can be reduced and thus the processing speed is improved. The second advantage is that the development cost of the software modules can be suppressed. A detailed description will be given below with reference to FIG. 9C.

As illustrated in FIG. 9C, the print execution unit 138 includes a PDL determination unit 138-1 inside, and controls a plurality of PDL analysis units (139*a*, 139*b*, and 139*c*). For example, the PDL analysis unit 139*a* is a PDL analysis unit that analyzes LBP Image Processing System (LIPS) (registered trademark of Canon Inc.). The PDL analysis unit 139*b* is a PDL analysis unit that analyzes PostScript (PS) (registered trademark of Adobe Systems Incorporated). The PDL analysis unit 139*c* is a PDL analysis unit that analyzes Extensible Markup Language (XML) Paper Specification (XPS) (registered trademark of Microsoft Corporation).

Without a skip, the print execution unit 138 determines the PDL included in the print job by the PDL determination unit 138-1. If the PDL is LIPS, the print execution unit 138 issues a notification needed for the PDL analysis unit 139*a* of LIPS. If the PDL is PS, the print execution unit 138 issue a notification needed for the PDL analysis unit 139*b* of PS. If the PDL is XPS, the print execution unit 138 issues a notification needed for the PDL analysis unit 139*c* of XPS.

If the print execution unit 138 notifies the PDL analysis units (139*a*, 139*b*, and 139*c*) of the advance processing result, the PDL analysis units (139*a*, 139*b*, and 139*c*) need to further notify the intermediate data generation unit 140 of the notification. If such a notification is accommodated, the processing steps increase and thus the processing speed is lowered. If each of the plurality of PDL analysis units (139*a*, 139*b*, and 139*c*) implements such a notification, the development cost of the software modules increases.

Then, in the present exemplary embodiment, the print execution unit 138 is configured to directly notify the intermediate data generation unit 140 of the advance processing result. This can provide the effects of improved processing speed and suppressed development cost. The PDL analysis unit 139 may be implemented by hardware. In such a case, the present configuration contributes more to the development cost.

In step S805, the intermediate data generation unit 140 generates intermediate data from the advance processing result notified from the print execution unit 138 in the foregoing step S804. More specifically, the intermediate data generation unit 140 obtains the image data on the page from the file path which is the advance processing result, and generates the intermediate data by using the image data. Steps S803 to S805 can significantly reduce the generation time of the intermediate data, compared to a case where the PDL analysis unit 139 analyzes the PDL data and the intermediate data generation unit 140 generates the intermediate data based on the analysis result as in steps S808 to S810 to be described below.

In step S806, the print execution unit 138 controls the RIP circuit 128 to render the generated intermediate data, and causes the print mechanism 111 to perform print processing.

In step S807, the print execution unit 138 determines whether all the pages of the print job have been analyzed. In a case where the print execution unit 138 determines that all the pages have not been analyzed yet (NO in step S807), the processing returns to step S801. The print execution processing then proceeds to the next page. On the other hand, in a case where the print execution unit 138 determines that all the pages have been analyzed (YES in step S807), the processing of the present flowchart ends.

Next, the processing (steps S808 to S810) when the analysis target page is determined, in the foregoing step S802, to be a page on which the advance processing is not performed will be described with reference to FIG. 9B.

In step S808, the print execution unit 138 notifies the PDL analysis unit 139 to start to analyze the analysis target page.

In step S809, the PDL analysis unit 139 analyzes the PDL data on the analysis target page, and notifies the intermediate data generation unit 140 of the analysis result.

In step S810, the intermediate data generation unit 140 generates intermediate data from the analysis result of the PDL analysis unit 139. The processing after the generation of the intermediate data is similar to when the analysis target page is determined to be a page on which the advance processing is performed. The processing of the present flowchart ends through the processing of steps S806 and S807.

As described above, the image forming apparatus 101 performs the advance rendering processing on a held print job, and stores the processing result (rendering processing result) in a storage device. When a print instruction for the held print job is given by the user, the image forming apparatus 101 attaches information about the stored rendering processing result to the print job. When printing is executed, the image forming apparatus 101 further performs rendering processing by using the information about the rendering processing result attached to the print job. Such a configuration can implement the advance processing of the print job held in the image forming apparatus 101. Since the information about the advance processing result is attached to the print job when printing is executed, and the information about the advance processing result is referred to during the finishing rendering processing, the load of the RIP circuit 128 can be reduced and thus the processing time of the rendering is reduced. As a result, the user's waiting time after the print instruction can be reduced. In the present exemplary embodiment, the advance processing result is attached to the PDL data (for example, attached to the beginning of the PDL data) without the PDL data itself being edited. This allows easy application to PDL data that is difficult to edit, such as Portable Document Format (PDF) data.

In the foregoing description, the format is described to be a "file path", and the file path information about the HDD 124 in which the advance processing result is stored is described to be attached to the PDL data as the information about the advance processing result. Useless memory copy of image data can thereby be suppressed to save memory resources. Alternatively, the format can be an "image", and the hold control unit 137 can attach the image data, which is the advance processing result itself, to the PDL data as the information about the advance processing result.

A second exemplary embodiment will be described. In the second exemplary embodiment, an image forming apparatus 101 has a server function, and after the image forming apparatus 101 receives a print job from a PC 104, the user instructs an image forming apparatus 102 (or 103) to execute printing. A description of components similar to those of the first exemplary embodiment will be omitted below, and differences from the first exemplary embodiments will be mainly described.

Figure 10:
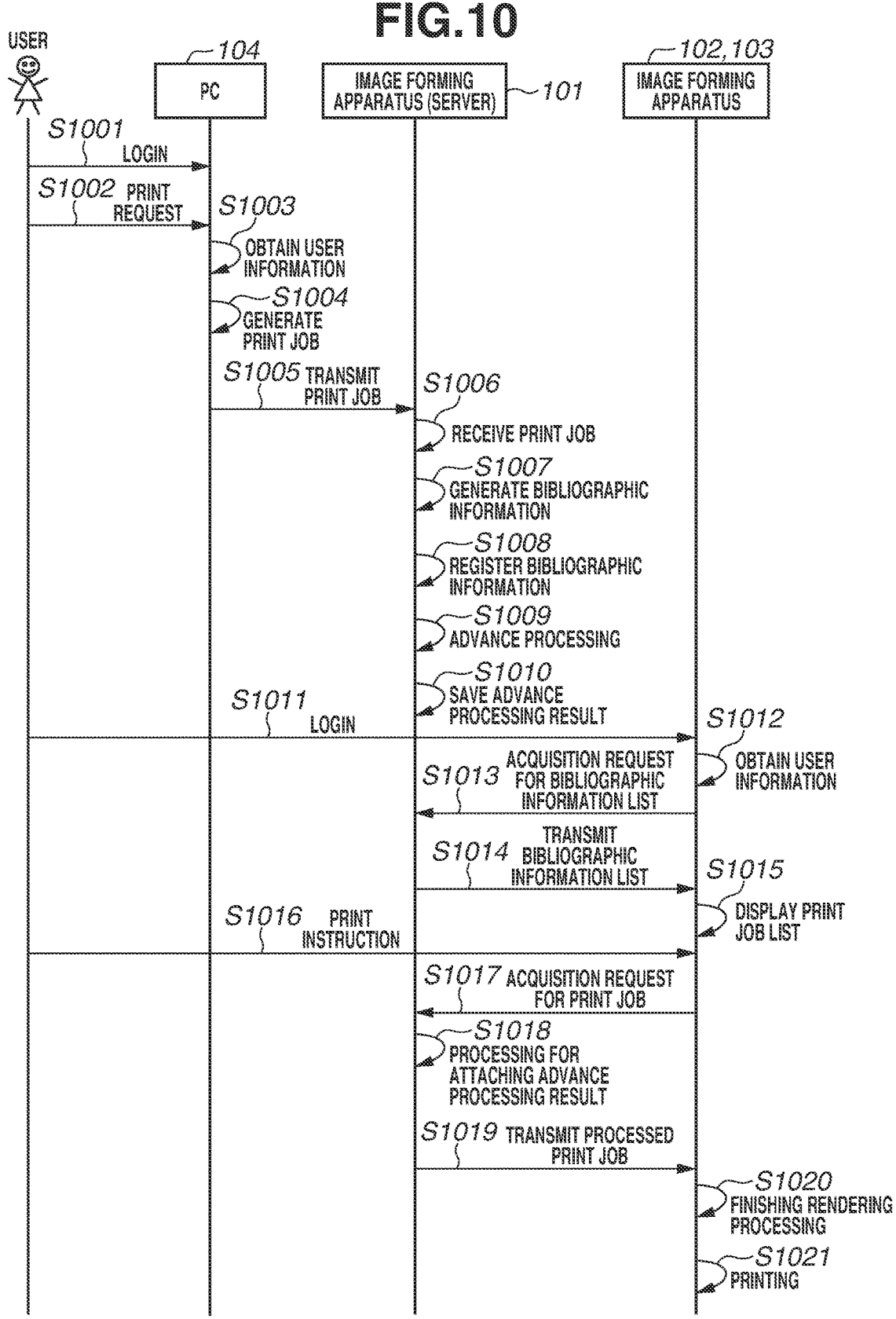
FIG. 10 is a sequence diagram illustrating print processing according to a second exemplary embodiment.

FIG. 10 illustrates an example of a sequence when the printing system including the image forming apparatuses 101 to 103 according to the second exemplary embodiment receives a print job from the PC 104 and prints the print job by the image forming apparatus 102 or 103. In FIG. 10, steps are denoted by an "S". The processing to be performed by the image forming apparatus 101, 102, or 103 in FIG. 10 is implemented by the CPU 123 of the image forming apparatus 101, 102, or 103 reading programs stored in the ROM 126 or HDD 124 into the RAM 125 and executing the programs according to need. The processing to be performed by the PC 104 in FIG. 10 is implemented by a not-illustrated CPU of the PC 104 reading programs stored in an HDD into a RAM and executing the programs according to need.

The processing of steps S1001 to S1010 is similar to the processing of steps S201 to S210 of FIG. 2, i.e., processing for holding a print job in the image forming apparatus 101. A description thereof will thus be omitted.

The processing of the image forming apparatuses 102 and 103 after step S1010 will be described by using the image forming apparatus 102. The same description applies to the image forming apparatus 103.

In step S1011, the user logs in to the image forming apparatus 102. In step S1012, the image forming apparatus 102 obtains the user information about the user. In step S1013, the image forming apparatus 102 issues an acquisition request for a bibliographic information list of the user to the image forming apparatus 101 which is the server apparatus. In step S1014, the image forming apparatus 101 receives the acquisition request for the bibliographic information list, and transmits the bibliographic information list of the user to the image forming apparatus 102. In step S1015, the image forming apparatus 102 receives the bibliographic information list from the image forming apparatus 101, and displays a print job list of the user on the operation panel 113 based on the bibliographic information list.

In step S1016, the image forming apparatus 102 receives a print instruction from the user. In step S1017, the image forming apparatus 102 issues an acquisition request for the print job corresponding to the print instruction to the image forming apparatus 101.

In step S1018, the image forming apparatus 101 attaches the result of the advance processing stored in step S1010 to the print job according to the acquisition request. In step S1019, the image forming apparatus 101 transmits the processed print job to which the advance processing result is attached to the image forming apparatus 102.

In step S1020, the image forming apparatus 102 receives the print job to which the advance processing result is attached, and performs the finishing rendering processing by using the advance processing result of the print job. In step S1021, the image forming apparatus 102 performs printing.

Figure 11:
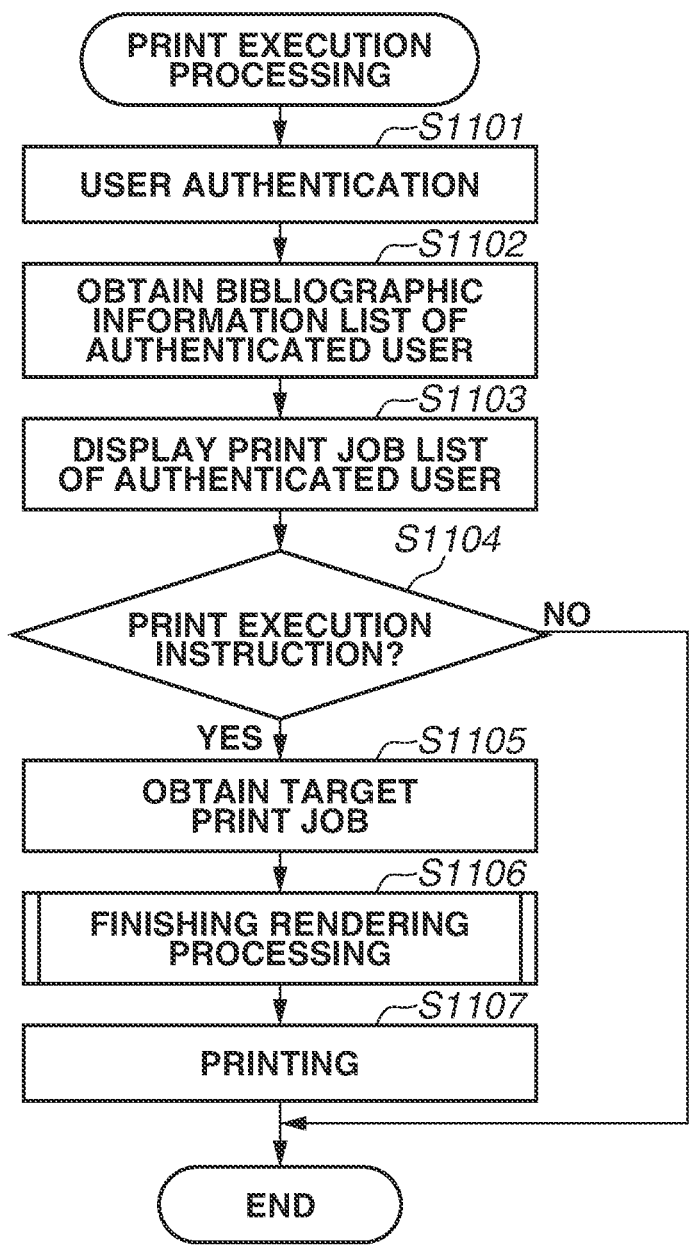
FIG. 11 is a flowchart for describing print execution processing according to the second exemplary embodiment.

FIG. 11 is a flowchart for describing an example of print execution processing to be performed by the software (131, 132, 133, and 138) of the controller 110 included in the image forming apparatuses 102 and 103 according to the second exemplary embodiment. The processing illustrated in FIG. 11 and FIG. 15 to be described below is implemented by the CPU 123 of the image forming apparatus 102 or 103 reading programs stored in the ROM 126 or the HDD 124 into the RAM 125 and executing the programs according to need.

The processing of step S1101 is similar to that of step S501 in FIG. 5. A description thereof will thus be omitted.

In step S1102, the bibliographic management unit 133 requests bibliographic information corresponding to the user information obtained in the foregoing step S1101 from the image forming apparatus having the server function (in the present exemplary embodiment, the image forming apparatus 101), and obtains a bibliographic information list.

In step S1103, the setting unit 132 generates a print job list based on the bibliographic information obtained in the foregoing step S1102, and displays the print job list on the operation panel 113 via the panel I/F 122. FIG. 16 illustrates an example of the information 1601 displayed on the operation panel 113 and an example of the print job list 1602 displayed.

In step S1104, like step S503 of FIG. 5, the setting unit 132 determines whether a print execution instruction for a print job displayed on the print job list 1602 is issued by the user. In a case where a print execution instruction is determined to not be issued (NO in step S1104), the processing of the present flowchart ends. On the other hand, in a case where a print execution instruction is determined to be issued (YES in step S1104), the processing proceeds to step S1105.

In step S1105, the setting unit 132 notifies the bibliographic management unit 133 that a print execution instruction is issued. The bibliographic management unit 133 requests the print job for which the print execution instruction is issued by the user in the foregoing step S1104 from the image forming apparatus having the server function, and obtains the print job. The bibliographic management unit 133 instructs the print execution unit 138 to print the print job. According to the instruction, the print execution unit 138 performs the processing of step S1106. If no information about the advance processing result is attached to the print job, the finishing rendering processing is similar to the processing of step S303 in FIG. 3. Details of finishing rendering processing when the information about the advance processing result is attached to the print job will be described below with reference to FIG. 15.

The processing of step S1107 is similar to that of step S304 in FIG. 3. A description thereof will thus be omitted. After step S1107, the processing of the present flowchart ends.

Figure 12:
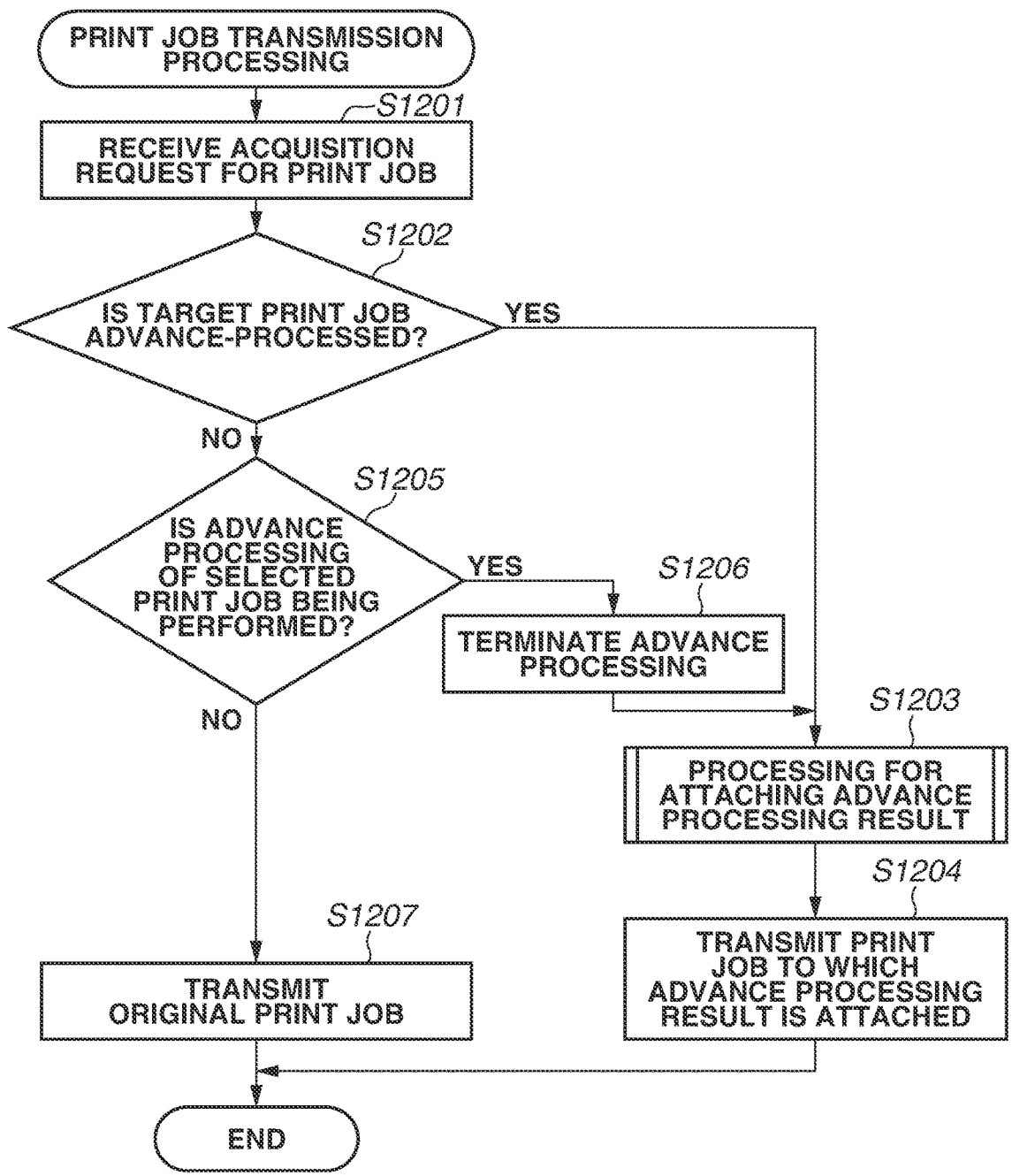
FIG. 12 is a flowchart for describing print job transmission processing according to the second exemplary embodiment.

FIG. 12 is a flowchart for describing an example of print job transmission processing to be performed by the software (133 and 137) of the controller 110 included in the image forming apparatus 101 having the server function according to the second exemplary embodiment. The processing illustrated in FIG. 12 and FIG. 13 to be described below is implemented by the CPU 123 of the image forming apparatus 101 reading programs stored in the ROM 126 or the HDD 124 into the RAM 125 and executing the programs according to need.

In step S1201, the bibliographic management unit 133 receives an acquisition request for a print job from the image forming apparatus 102 or 103 via the network I/F 120, and notifies the hold control unit 137 of the acquisition request.

In step S1202, the hold control unit 137 determines whether the print job for which the acquisition request is issued is advance-processed. The hold control unit 137 makes the determination by referring to the bibliographic information and obtaining the information, attached in step S407 of FIG. 4, indicating whether the advance information is done.

In step S1202, in a case where the print job is determined to be advance-processed (YES in step S1202), the processing proceeds to step S1203.

Figure 13:
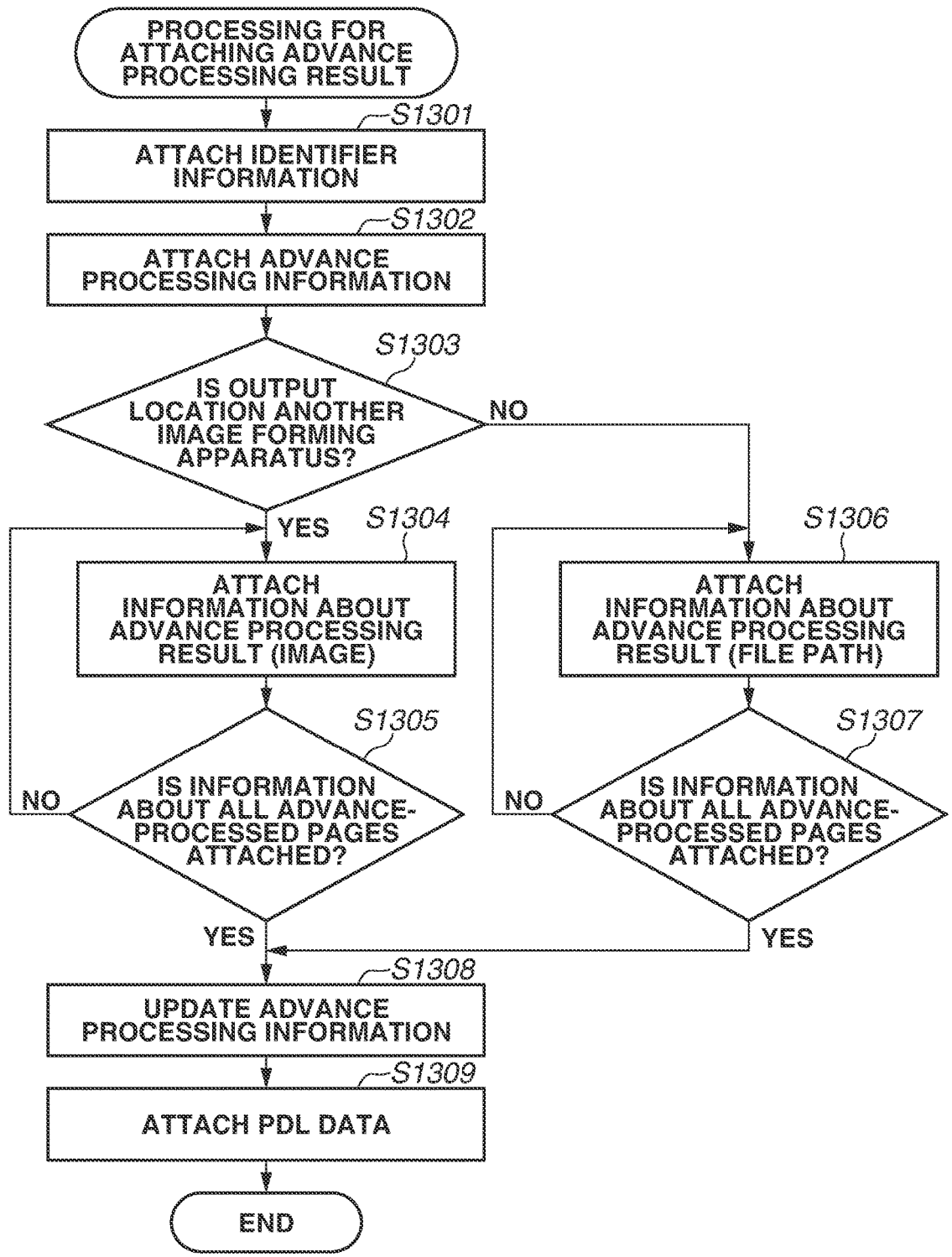
FIG. 13 is a flowchart for describing processing for attaching an advance processing result according to the second exemplary embodiment.

In step S1203, the hold control unit 137 performs processing for attaching the information about the advance processing result to the PDL data to generate a print job. Details of the processing for attaching the advance processing result will be described below (FIG. 13). The hold control unit 137 further passes the processed print job to which the advance processing result is attached to the bibliographic management unit 133. In step S1204, the bibliographic management unit 133 transmits the processed print job to which the advance processing result is attached to the requesting image forming apparatus. The processing of the present flowchart ends.

In step S1202, in a case where the print job is determined to not be advance-processed (NO in step S1202), the processing proceeds to step S1205.

In step S1205, the hold control unit 137 determines whether the advance processing of the print job for which the acquisition request is issued is currently performed. Like the foregoing step S1202, the hold control unit 137 can make the determination by referring to the bibliographic information and determining whether the advance processing is currently performed. Alternatively, the hold control unit 137 can make the determination depending on whether there is image data, on which the advance rendering processing is completed, associated with the bibliographic information in step S405 of FIG. 4.

In step S1205, in a case where the advance processing of the print job for which the acquisition request is issued is determined to be currently performed (YES in step S1205), the processing proceeds to step S1206.

In step S1206, the hold control unit 137 terminates the advance processing of the print job. The information that the advance processing is terminated is notified to the advance processing unit 136 and used to make the determination whether there is a print execution instruction, described in step S408 of FIG. 4. After step S1206, the hold control unit 137 obtains the advance processing result saved to the HDD 124 at the time of termination of the advance processing (image data associated with the corresponding bibliographic information in step S405 of FIG. 4) as advance processing information. In step S1203, the hold control unit 137 attaches the advance processing information to the print job. The hold control unit 137 further passes the processed print job to which the advance processing result is attached to the bibliographic management unit 133. In step S1204, the bibliographic management unit 133 transmits the processed print job to which the advance processing result is attached to the requesting image forming apparatus. The processing of the present flowchart ends.

In step S1205, in a case where the advance processing of the print job for which the acquisition request is issued is determined to not be currently performed (NO in step S1205), the processing proceeds to step S1207. The hold control unit 137 passes the original print job to the bibliographic management unit 133. In step S1207, the bibliographic management unit 133 transmits the original print job to the requesting image forming apparatus. The processing of the present flowchart ends.

FIG. 13 is a flowchart for describing an example of the processing for attaching the advance processing result (step S1203 of FIG. 12) to be performed by the hold control unit 137 of the controller 110 included in the image forming apparatus 101 having the server function according to the second exemplary embodiment.

Figure 14:
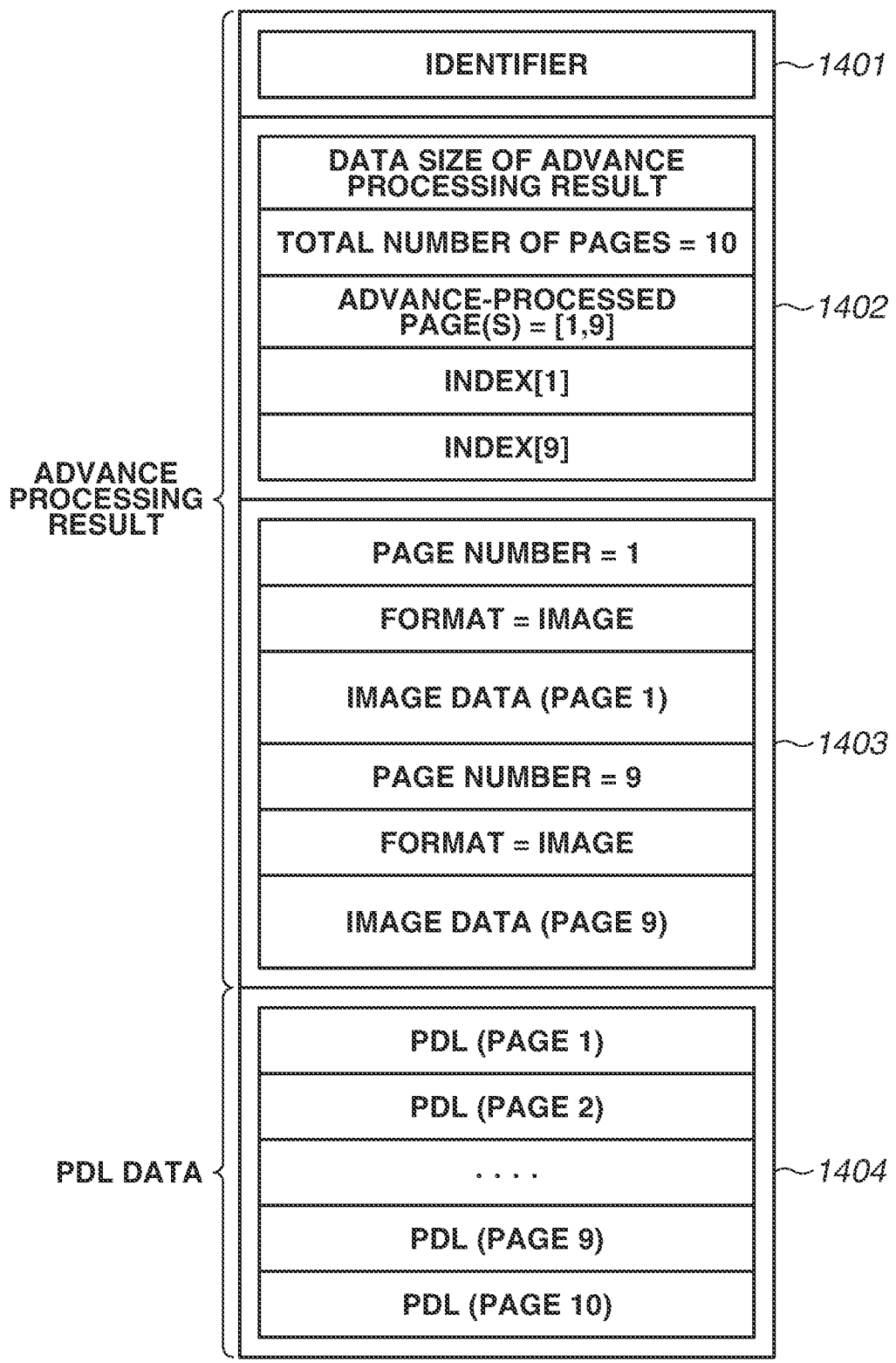
FIG. 14 is a diagram for describing a print job after attachment of the advance processing result according to the second exemplary embodiment

FIG. 14 is a diagram for describing an example of the advance processing result to be attached to the PDL data by the processing for attaching the advance processing result according to the second exemplary embodiment.

In step S1301, the hold control unit 137 attaches identifier information (1401 in FIG. 14) at the beginning of the processing for attaching the advance processing result to the PDL data. Basic processing details, such as the identifier information, are similar to those of step S601 in FIG. 6.

In step S1302, the hold control unit 137 attaches the advance processing information (1402 in FIG. 14) after the identifier information attached in the foregoing step S1301. Basic processing details, such as the advance processing information, are similar to those of step S602 in FIG. 6.

In step S1303, the hold control unit 137 determines which image forming apparatus the location for the target print job to be output to is. In the case of the example described in FIG. 12, the location can be determined to be another image forming apparatus since the processing is performed in response to an acquisition request for a print job from an external image forming apparatus. In the case of the example described in the first exemplary embodiment, the print job is determined to be output to the image forming apparatus in which the print job is held (i.e., not another image forming apparatus).

In step S1303, in a case where the location for the print job to be output to is determined to be another image forming apparatus (YES in step S1303), the processing proceeds to step S1304.

In step S1304, the hold control unit 137 attaches the information about the advance processing result (1403 in FIG. 14) after the advance processing information attached in the foregoing step S1302. Here, the information is attached with a piece of information indicating a page number of the advance processing result, a piece of information indicating a format, and a piece of information indicating the information about the advance processing result as a set. In the case of the information 1403, a set of pieces of information about the first page is initially attached. The format of the advance processing result is an "image". If the format is an "image", the hold control unit 137 reads the image data from the HDD 124 in which the advance processing result is stored, and attaches the image data as the information about the advance processing result.

In step S1305, the hold control unit 137 determines whether information about all advance-processed pages is attached. In a case where the information about all the advance-processed pages is determined to not be attached yet (NO in step S1305), the processing returns to step S1304. The processing then proceeds to the next page.

On the other hand, in a case where the information about all the advance-processed pages is determined to be attached (YES in step S1305), the processing proceeds to step S1308.

In step S1303, in a case where the location for the print job to be output to is determined to not be another image forming apparatus (NO in step S1303), the processing proceeds to step S1306.

The processing of steps S1306 and S1307 is similar to that of steps S603 and S604 in FIG. 6. The hold control unit 137 attaches the file path where the print job is stored in the image forming apparatus as the information about the advance processing result. The processing proceeds to step S1308.

The processing of steps S1308 and S1309 is similar to that of steps S605 and S606 in FIG. 6. A description thereof will thus be omitted.

In FIG. 13, the image forming apparatus 101 is described to determine the output location in step S1303 and attach either image data or a file path according to the output location. Alternatively, the image forming apparatus 101 can be configured to always attach image data in steps S1304 and S1305 without the determination of step S1303.

Figure 15:
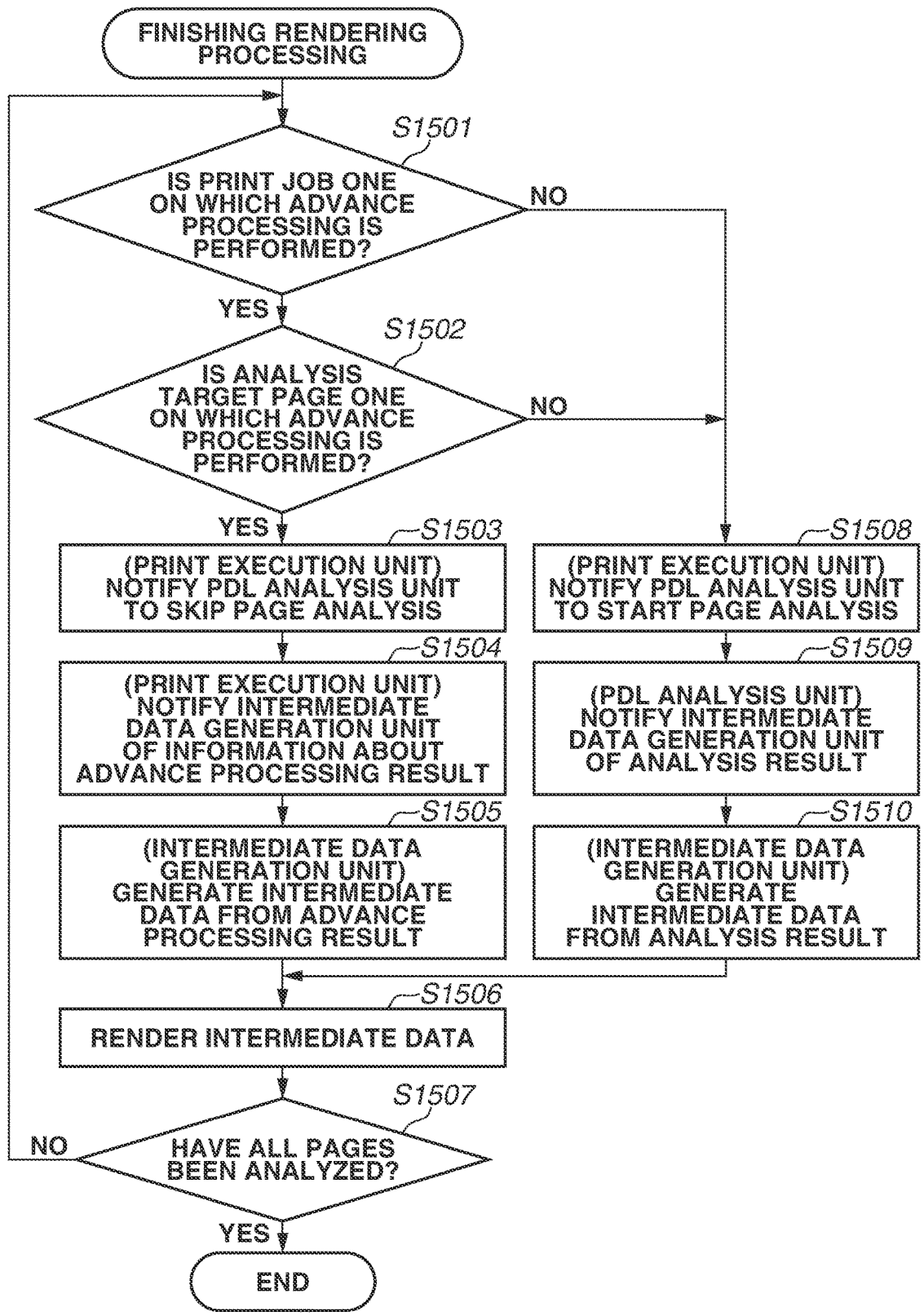
FIG. 15 is a flowchart for describing finishing rendering processing according to the second exemplary embodiment.

FIG. 15 is a flowchart for describing an example of the finishing rendering processing (step S1106 of FIG. 11) to be performed by the software (138 to 140) of the controller 110 included in the image forming apparatuses 102 and 103 according to the second exemplary embodiment.

The processing of steps S1501 and S1502 is similar to that of steps S801 and S802 of FIG. 8. A description thereof will thus be omitted. The processing of step S1503 is similar to that of step S803 of FIG. 8. A description thereof will thus be also omitted.

In step S1504, the print execution unit 138 notifies the intermediate data generation unit 140 of the information about the advance processing result of the analysis target page (1403 of FIG. 14).

In the case of the print job illustrated in FIG. 14, if the analysis target page of the print execution unit 138 is page 1, the print execution unit 138 notifies the intermediate data generation unit 140 of the image data (RIP image of page 1) attached to the print job as the advance processing result.

The processing of steps S1505, S1506, and S1507 is similar to that of steps S805, S806, and S807 of FIG. 8, respectively. A description thereof will thus be omitted. The processing of steps S1508, S1509, and S1510 is similar to that of steps S808, S809, and S810 of FIG. 8, respectively. A description thereof will thus be also omitted.

As described above, according to the second exemplary embodiment, the advance processing on a print job held in the image forming apparatus 101 having the server function can be implemented. If the image forming apparatus 101 receives a print job acquisition request after a print instruction from the user, the image forming apparatus 101 can determine whether the output location is another image forming apparatus or the image forming apparatus 101, and switch the method for attaching the information about the advance processing result. The image forming apparatus 101 notifies another image forming apparatus of all the information by including the image(s) itself/themselves into the advance processing result. On the other hand, if the image forming apparatus 101 itself performs printing, only the file path(s) is/are notified so that the advance processing result can be efficiently referred to by making reference during the finishing rendering processing. In either case, the user's waiting time after execution of printing can be reduced since the information about the advance processing result can be referred to during the finishing rendering processing.

In the foregoing exemplary embodiments, an image forming apparatus performs rendering processing in advance while a print job is held. Specifically, the image forming apparatus performs the rendering processing in advance during holding of the print job, and stores the result of the rendering processing in a storage device. When a print instruction for the held print job is given by the user, the image forming apparatus attaches the information about the stored result of the rendering processing to the print job. The image forming apparatus uses the information about the result of the rendering processing, attached to the print job, during execution of printing, whereby the rendering processing time during the execution of the printing can be reduced. As described above, the image forming apparatus according to the present exemplary embodiment is characterized in performing the rendering processing during the execution of the printing by using the result of the rendering processing performed in advance. This can reduce the print processing time of hold printing after a print instruction is given by the user, and reduce the user's wait for output.

In the foregoing second exemplary embodiment, the image forming apparatus 101 having the server function is described to be configured to perform the advance processing and attach the advance processing result. Alternatively, such functions of the image forming apparatus 101 can be implemented by a printing server (print server).

The configurations and contents of the various types of data described above are not limited thereto. Various configurations and contents can be included depending on the intended use and purpose.

While several exemplary embodiments of the present invention have been described above, exemplary embodiments of the present invention may include, for example, a system, an apparatus, a method, a program, and a storage medium. Specifically, an exemplary embodiment of the present invention may be applied to a system including a plurality of devices, or an apparatus including a single device.

All combinations of the foregoing exemplary embodiments are also covered by the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-042666, filed Mar. 7, 2017, which is hereby incorporated by reference herein in its entirety.

What is claimed is:

1. An image forming apparatus comprising:
at least one controller including a processor configured to execute a program stored in a memory or a circuit configured to implement a function, the at least one controller being configured to function as:
a receiving unit configured to receive print data including page description language (PDL) data, wherein the print data has a plurality of pages;
a generating unit configured to generate intermediate data by interpreting the PDL data of the received print data;
a holding unit configured to hold generated intermediate data corresponding to a part of the plurality pages of the print data and hold PDL data corresponding to other part of the plurality of pages of the print data, wherein intermediate data based on the held PDL data corresponding to the other part is generated after the PDL data corresponding to the other part is transmitted from the holding unit to the generating unit; and a rendering unit configured to generate image data based on first intermediate data and second intermediate data, wherein the first intermediate data corresponds to the intermediate data held by the holding unit and the second intermediate data is generated by the generating unit based on the PDL data held by the holding unit.

2. The image forming apparatus according to claim 1, wherein the at least one controller is further configured to function as an identifying unit configured to identify a page for which the generating unit generates intermediate data and a page for which the generating unit does not generate intermediate data.

3. The image forming apparatus according to claim 2, wherein the identifying unit identifies the page for which the generating unit generates intermediate data and the page for which the generating unit does not generate intermediate data, based on information about a number of commands included in the pages of the PDL data.

4. The image forming apparatus according to claim 3, wherein the identifying unit identifies the page for which the generating unit generates intermediate data and the page for which the generating unit does not generate intermediate data, based on information about time for generating intermediate data corresponding to the pages.

5. The image forming apparatus according to claim 1, wherein the at least one controller is further configured to function as a storing unit configured to store information indicating a page number of the page of which intermediate data is generated.

6. The image forming apparatus according to claim 1, wherein the at least one controller is further configured to function as a storing unit configured to store storage location information about the page of which intermediate data is generated.

7. The image forming apparatus according to claim 1, wherein the at least one controller is further configured to function as a grouping unit configured to group the PDL data and the intermediate data generated by the generating unit into a set of data to allow transmission to another image forming apparatus.

8. An image forming method comprising:

receiving print data including page description language (PDL) data, wherein the print data has a plurality of pages;

generating, by a generating unit, first intermediate data corresponding to a part of a plurality of pages of the print data based on the received PDL data;

holding the generated first intermediate data and PDL data corresponding to other part of the plurality of pages of the print data, wherein second intermediate data based on the held PDL data corresponding to the other part is generated after the PDL data corresponding to the other part is transmitted from the holding unit to the generating unit;

generating, by the generating unit, the second intermediate data based on the held PDL data; and generating image data based on the first intermediate data and the second intermediate data.

9. The image forming method according to claim 8, further comprising identifying a page of which intermediate data is generated and a page of which intermediate data is not generated.

10. The image forming method according to claim 9, wherein the identifying includes identifying the page of which intermediate data is generated and the page of which intermediate data is not generated, based on information about a number of commands included in the pages of the PDL data.

11. The image forming method according to claim 10, wherein the identifying includes identifying the page of which intermediate data is generated and the page of which intermediate data is not generated, based on information about time for generating image data corresponding to the pages.

12. The image forming method according to claim 8, further comprising storing information about a page number of the page of which intermediate data is generated.

13. The image forming method according to claim 8, further comprising storing storage location information about the page of which intermediate data is generated.

14. The image forming method according to claim 8, further comprising grouping the PDL data and the intermediate data generated in the generating into a set of data to allow transmission to another image forming apparatus.

* * * * *